(12) United States Patent
Hartmann et al.

(10) Patent No.: US 12,377,627 B2
(45) Date of Patent: Aug. 5, 2025

(54) SYSTEMS AND METHODS FOR MANUFACTURING A PORTION OF AN ARTICLE OF FOOTWEAR FROM A MOLD

(71) Applicant: PUMA SE, Herzogenaurach (DE)

(72) Inventors: Matthias Hartmann, Forchheim (DE); Reinhold Sussmann, Scheinfeld (DE); Neil Jafar Narriman, Herzogenaurach (DE)

(73) Assignee: PUMA SE, Herzogenaurach (DE)

( * ) Notice: Subject to any disclaimer, the term of this patent is extended or adjusted under 35 U.S.C. 154(b) by 188 days.

(21) Appl. No.: 17/985,305

(22) Filed: Nov. 11, 2022

(65) Prior Publication Data

US 2023/0150221 A1    May 18, 2023

Related U.S. Application Data

(60) Provisional application No. 63/279,436, filed on Nov. 15, 2021.

(51) Int. Cl.
| | |
|---|---|
| *B29D 35/12* | (2010.01) |
| *A43B 13/18* | (2006.01) |
| *B29C 45/26* | (2006.01) |
| *B29D 35/00* | (2010.01) |
| *B29D 35/14* | (2010.01) |
| *B29L 31/50* | (2006.01) |

(52) U.S. Cl.
CPC .......... *B29D 35/128* (2013.01); *A43B 13/188* (2013.01); *B29C 45/26* (2013.01); *B29C 45/2602* (2013.01); *B29D 35/0009* (2013.01); *B29D 35/0054* (2013.01); *B29D 35/122* (2013.01); *B29D 35/142* (2013.01); *B29L 2031/50* (2013.01)

(58) Field of Classification Search
CPC .......................... B29D 35/128; B29D 35/0054
See application file for complete search history.

(56) References Cited

U.S. PATENT DOCUMENTS

| | | | |
|---|---|---|---|
| 2007/0113425 A1* | 5/2007 | Wakley | A43B 13/20 36/28 |
| 2012/0210606 A1* | 8/2012 | Gheorghian | A43B 13/127 36/103 |
| 2015/0272272 A1 | 10/2015 | Scofield | |
| 2020/0275739 A1 | 9/2020 | Linkfield | |
| 2020/0281314 A1* | 9/2020 | Stockbridge | B29D 35/128 |

OTHER PUBLICATIONS

Search Report of European Patent Application No. 22207084.9, mailed Apr. 14, 2023, 7 pages.

* cited by examiner

*Primary Examiner* — Virak Nguon
(74) *Attorney, Agent, or Firm* — Quarles & Brady LLP

(57) ABSTRACT

A method for manufacturing a sole assembly of an article of footwear includes injecting a first material into a first mold to forming a first component. A second material is injected into a second mold to form a second component in the second mold. The first component is formed from a first material and includes a first plurality of channel elements. The second component is formed from a second material and includes a second plurality of channel elements. Each of the first plurality of channel elements is aligned with a corresponding one of the second plurality of channel elements, and the first component is secured to the second component to form an initial sole assembly.

20 Claims, 21 Drawing Sheets

SYSTEMS AND METHODS FOR MANUFACTURING A PORTION OF AN ARTICLE OF FOOTWEAR FROM A MOLD

CROSS REFERENCE TO RELATED APPLICATIONS

This application claims priority to U.S. Provisional Patent Application No. 63/279,436 filed Nov. 15, 2021, the entirety of which is incorporated by reference.

REFERENCE REGARDING FEDERALLY SPONSORED RESEARCH OR DEVELOPMENT

Not applicable.

SEQUENCE LISTING

Not applicable.

BACKGROUND

1. Field of the Invention

The present disclosure relates generally to manufacturing a portion of an article of footwear from a mold.

2. Description of the Background

Many conventional shoes or articles of footwear generally comprise an upper and a sole attached to a lower end of the upper. Conventional shoes further include an internal space, e.g., a void or cavity, which is created by interior surfaces of the upper and sole, which receives a foot of a user before securing the shoe to the foot. The sole is attached to a lower surface of the upper and is positioned between the upper and the ground. As a result, the sole typically provides stability and cushioning to the user when the shoe is being worn and/or is in use. In some instances, the sole may include multiple components, such as an outsole, a midsole, and an insole. The outsole may provide traction to a bottom surface of the sole, and the midsole may be attached to a surface of the outsole.

Typically, at least a portion of the sole is formed from a mold, but conventional molding processes are limited by geometry of the formed sole. The soles formed from a mold in conventional footwear articles are accordingly limited to simplistic geometries that are capable of being produced with conventional molding processes.

SUMMARY

An article of footwear, as described herein, may have various configurations. The article of footwear may have an upper and a sole assembly connected to the upper. In some embodiments, the sole assembly may include a midsole that is formed by a molding process. The molding process may efficiently form and maintain complex features in a midsole, e.g., undercuts, overhangs, apertures, tunnels, channels, etc.

In some embodiments, a method for manufacturing a sole assembly of an article of footwear includes injecting a first material into a first mold forming a first component in the first mold, and injecting a second material into a second mold forming a second component in the second mold. The first component is formed from the first material and includes a first plurality of channel elements. The second component is formed from the second material and includes a second plurality of channel elements. Each of the first plurality of channel elements is aligned with a corresponding one of the second plurality of channel elements, and the first component is secured to the second component to form an initial sole assembly.

In some embodiments, a method for manufacturing a sole assembly of an article of footwear includes inserting a mold insert and a first set of slider pins into a first mold base, flowing a first material into the first mold base to form a first component, removing the first component from the first mold base and the mold insert and inserting the first component into a second mold, and flowing a second material into the second mold and around the first component to form a second component that is attached to the first component. The first component has a plurality of tubes that extend laterally across the first component. The mold insert arranges the plurality of tubes below an upper surface of the first component within the first mold base. The second mold includes a second set of slider pins each received within a corresponding one of the plurality of tubes. The first component and the second component form a sole assembly.

In some embodiments, an article of footwear include an upper and a sole assembly defining a heel region, a midfoot region, and a forefoot region. The sole assembly includes a first component having a plurality of tubes attached to an upper surface thereof, and a second component including a plurality of apertures. The plurality of tubes extend laterally along the first component and are spaced apart in a heel-toe direction along at least the heel region. Each of the plurality of apertures defines a shape that is complementary to a shape defined by a corresponding one of the plurality of tubes in the first component. Each of the plurality of tubes is arranged within a corresponding one of the plurality of apertures to mechanically couple the first component to the second component.

Other aspects of the articles of footwear or portions of the articles of footwear described herein, including features and advantages thereof, will become apparent to one of ordinary skill in the art upon examination of the figures and detailed description herein. Therefore, all such aspects of the articles of footwear are intended to be included in the detailed description and this summary.

DETAILED DESCRIPTION OF THE DRAWINGS

Figure 1:
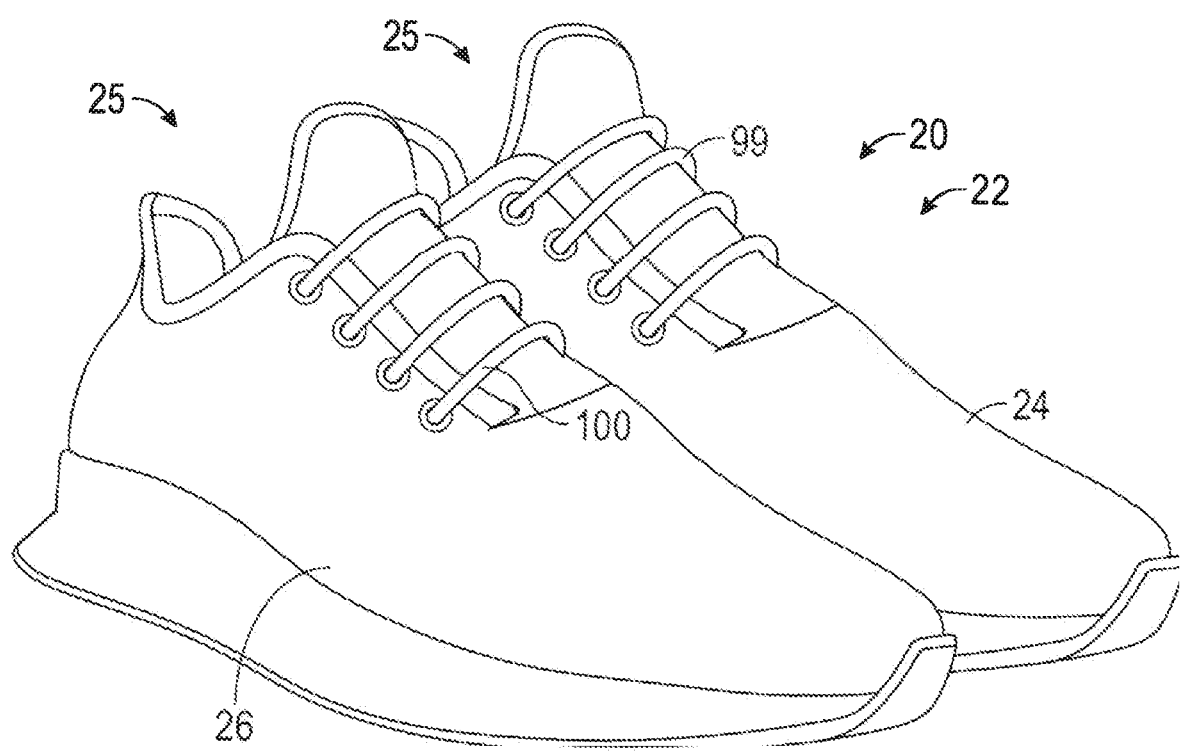
FIG. 1 is a perspective view of a footwear assembly including an article of footwear.

The following discussion and accompanying figures disclose various embodiments or configurations of a shoe. Although embodiments are disclosed with reference to a sports shoe, such as a running shoe, tennis shoe, basketball shoe, etc., concepts associated with embodiments of the shoe may be applied to a wide range of footwear and footwear styles, including basketball shoes, cross-training shoes, football shoes, golf shoes, hiking shoes, hiking boots, ski and snowboard boots, soccer shoes and cleats, walking shoes, and track cleats, for example. Concepts of the shoe may also be applied to articles of footwear that are considered non-athletic, including dress shoes, sandals, loafers, slippers, and heels. In addition to footwear, particular concepts described herein may also be applied and incorporated in other types of articles, including apparel or other athletic equipment, such as helmets, padding or protective pads, shin guards, and gloves. Even further, particular concepts described herein may be incorporated in cushions, backpacks, suitcases, backpack straps, golf clubs, or other consumer or industrial products. Accordingly, concepts described herein may be utilized in a variety of products.

The term "about," as used herein, refers to variation in the numerical quantity that may occur, for example, through typical measuring and manufacturing procedures used for articles of footwear or other articles of manufacture that may include embodiments of the disclosure herein; through inadvertent error in these procedures; through differences in the manufacture, source, or purity of the ingredients used to make the compositions or mixtures or carry out the methods; and the like. Throughout the disclosure, the terms "about" and "approximately" refer to a range of values±5% of the numeric value that the term precedes.

The present disclosure is directed to an article of footwear and/or specific components or portions of the article of footwear, such as a midsole, an outsole, or a sole assembly. The article of footwear may include an upper that is at least partially formed from a knitted component, a woven textile, a non-woven textile, leather, mesh, suede, and/or a combination of one or more of the aforementioned materials. The knitted component may be made by knitting of yarn, the woven textile by weaving of yarn, and the non-woven textile by manufacture of a unitary non-woven web. Knitted textiles include textiles formed by way of warp knitting, weft knitting, flat knitting, circular knitting, and/or other suitable knitting operations. The knit textile may have a plain knit structure, a mesh knit structure, and/or a rib knit structure, for example. Woven textiles include, but are not limited to, textiles formed by way of any of the numerous weave forms, such as plain weave, twill weave, satin weave, dobbin weave, jacquard weave, double weaves, and/or double cloth weaves, for example. Non-woven textiles include textiles made by air-laid and/or spun-laid methods, for example. The upper may comprise a variety of materials, such as a first yarn, a second yarn, and/or a third yarn, which may have varying properties or varying visual characteristics.

FIG. 1 depicts a footwear assembly 20 that includes a pair of shoes 22 that are wearable by a user. In some embodiments, the footwear assembly 20 may include a left shoe 24 and a right shoe 26. The left shoe 24 and the right shoe 26 may be similar in all material aspects, except that the left shoe 24 and the right shoe 26 are sized and shaped to receive a left foot and a right foot of a user, respectively. For ease of disclosure, a single shoe or article of footwear 25 will be referenced to describe aspects of the disclosure. In some figures, the article of footwear 25 is depicted as a right shoe, and in some figures the article of footwear is depicted as a left shoe. The disclosure below with reference to the article of footwear 25 is applicable to both the left shoe 24 and the right shoe 26.

FIGS. 2-5 depict an exemplary embodiment of the article of footwear 25 including an upper 28 and a sole assembly 30. As will be further discussed herein, the upper 28 is attached to the sole assembly 30 and together define an interior cavity 32 (see FIGS. 4 and 5) into which a foot of a user may be inserted. For reference, the article of footwear 25 defines a forefoot region 34, a midfoot region 36, and a heel region 38 (see FIG. 5). The forefoot region 34 generally corresponds with portions of the article of footwear 25 that encase portions of the foot that include the toes, the ball of the foot, and joints connecting the metatarsals with the toes or phalanges. The midfoot region 36 is proximate and adjoining the forefoot region 34, and generally corresponds with portions of the article of footwear 25 that encase the arch of a foot, along with the bridge of a foot. The heel region 38 is proximate and adjoining the midfoot region 36 and generally corresponds with portions of the article of footwear 25 that encase rear portions of the foot, including the heel or calcaneus bone, the ankle, and/or the Achilles tendon. This geometric definition for the bounds of the forefoot region 34, the midfoot region 36, and the heel region 38 also applies to other forefoot regions, midfoot regions, and heel regions described herein.

Figure 2:
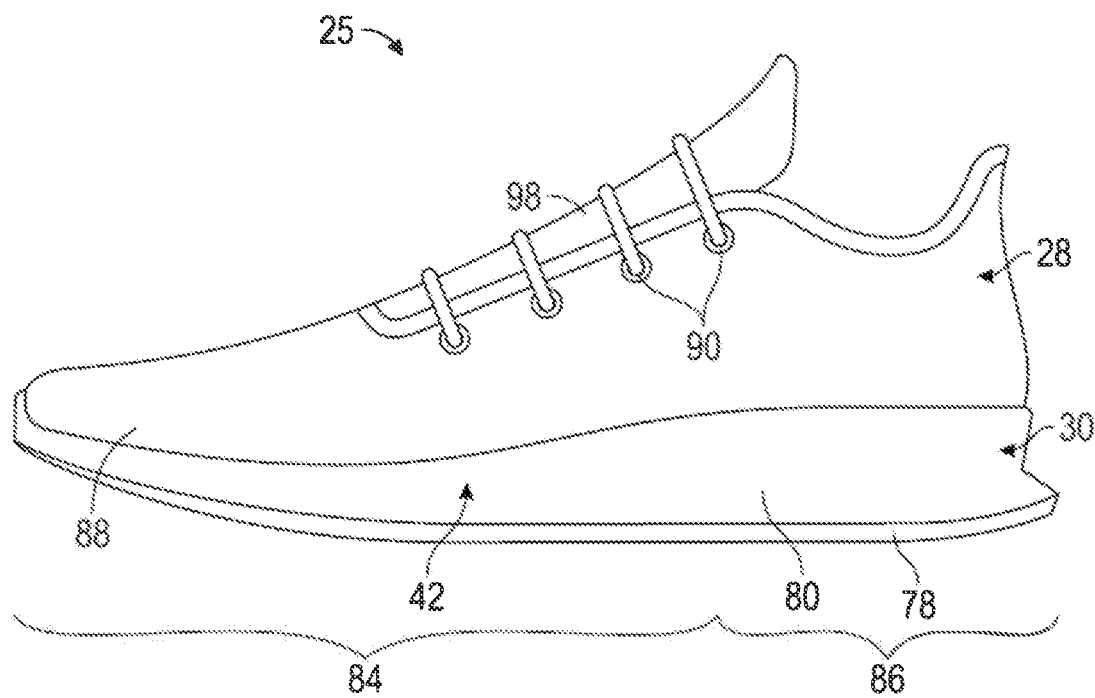
FIG. 2 is a left or lateral side view of an article of footwear in the form of a left shoe.
Figure 3:
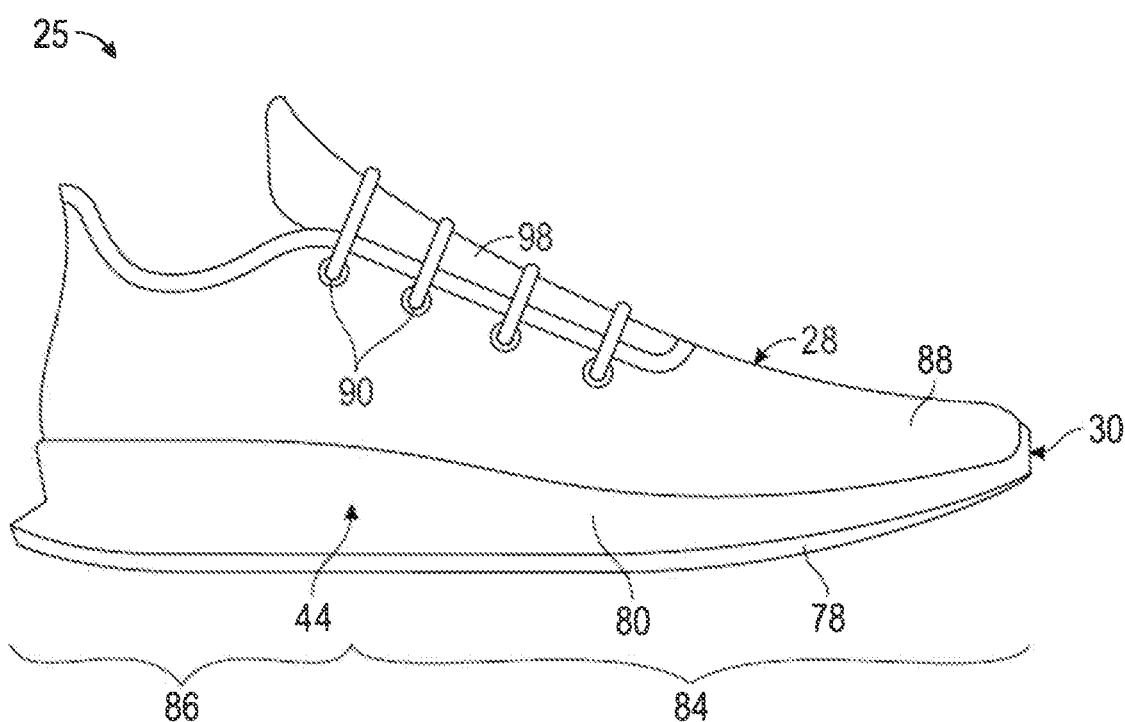
FIG. 3 is a right or medial side view of the article footwear of FIG. 2.

The article of footwear 25 defines a lateral side 42 (see FIG. 2) and a medial side 44 (see FIG. 3). When a user is wearing the shoes, the lateral side 42 corresponds with an outside-facing portion of the article of footwear 25 while the medial side 44 corresponds with an inside-facing portion of the article of footwear 25. As such, the left shoe 24 and the right shoe 26 have opposing lateral sides 42 and medial sides 44, such that the medial sides 44 are closest to one another when a user is wearing the shoes 22, while the lateral sides 42 are defined as the sides that are farthest from one another while the shoes 22 are being worn.

Figure 5:
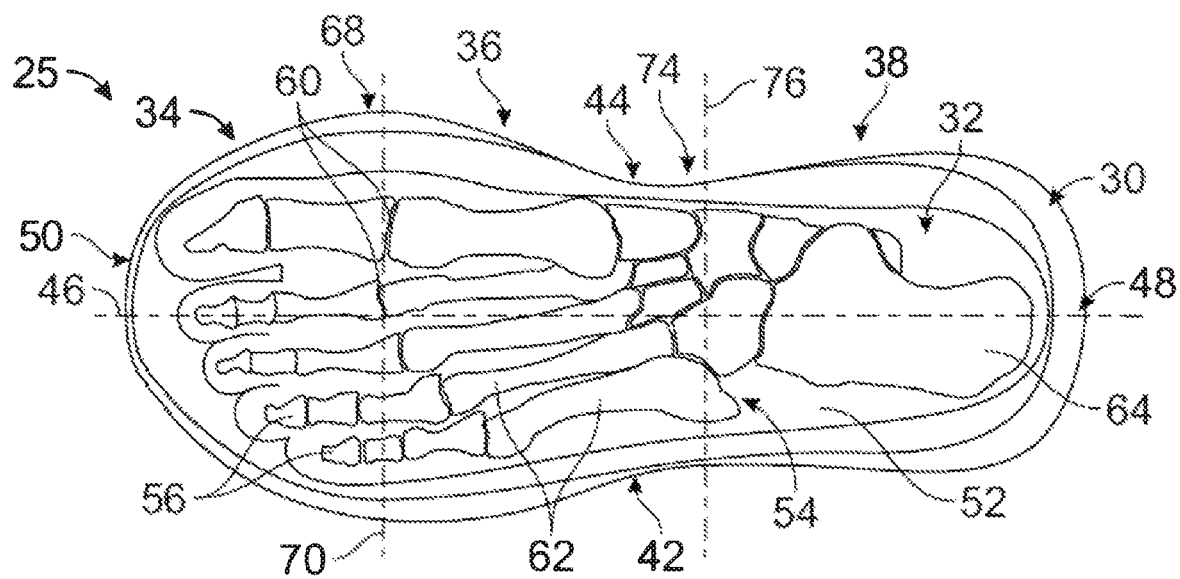
FIG. 5 is a top plan view of the article of footwear of FIG. 2, with an upper removed and a user's skeletal foot structure overlaid on the article of footwear.

The medial side 44 and the lateral side 42 adjoin one another along a longitudinal central plane or axis 46 of the article of footwear 25 (see FIG. 5). As will be further discussed herein, the longitudinal central plane or axis 46 may demarcate a central, intermediate axis between the medial side 44 and the lateral side 42 of the article of footwear 25. Put differently, the longitudinal plane or axis 46 may extend between a rear distal end 48 of the article of footwear 25 and a front distal end 50 of the article of footwear 25 and may continuously define a middle of an insole 52, the sole assembly 30, and/or the upper 28 of the article of footwear 25, i.e., the longitudinal plane or axis 46 is a straight axis extending through the rear distal end 48 of the heel region 38 to the front distal end 50 of the forefoot region 34.

The forefoot region 34 may generally correspond with portions of the article of footwear 25 that encase portions of a foot 54 that include the toes or phalanges 56, the ball of the foot 54, and one or more of the joints 60 that connect the metatarsals 62 of the foot 54 with the toes or phalanges 56 (see FIG. 5). The midfoot region 36 is proximate and adjoins the forefoot region 34. The midfoot region 36 generally corresponds with portions of the article of footwear 25 that encase an arch of a foot 54, along with a bridge of the foot 54. The heel region 38 is proximate to the midfoot region 36 and adjoins the midfoot region 36. The heel region 38 generally corresponds with portions of the article of footwear 25 that encase rear portions of the foot 54, including the heel or calcaneus bone 64, the ankle (not shown), and/or the Achilles tendon (not shown).

The forefoot region 34, the midfoot region 36, the heel region 38, the medial side 44, and the lateral side 42 are intended to define boundaries or areas of the article of footwear 25. To that end, the forefoot region 34, the midfoot region 36, the heel region 38, the medial side 44, and the lateral side 42 generally characterize sections of the article of footwear 25. Certain aspects of the disclosure may refer to portions or elements that are coextensive with one or more of the forefoot region 34, the midfoot region 36, the heel region 38, the medial side 44, or the lateral side 42. Further, both the upper 28 and the sole assembly 30 may be characterized as having portions within the forefoot region 34, the midfoot region 36, the heel region 38, and/or along the medial side 44 and/or the lateral side 42. Therefore, the upper 28 and the sole assembly 30, and/or individual portions of the upper 28 and the sole assembly 30, may include portions thereof that are disposed within the forefoot region 34, the midfoot region 36, the heel region 38, and/or along the medial side 44 and/or the lateral side 42.

The forefoot region 34 extends from the front distal end 50 to a widest portion 68 of the article of footwear 25. The widest portion 68 is defined or measured along a first line 70 that is perpendicular with respect to the longitudinal axis 46 that extends from the front distal end 50 to the rear distal end 48, which is opposite the front distal end 50. The midfoot region 36 extends from the widest portion 68 to a thinnest portion 74 of the article of footwear 25. The thinnest portion 74 of the article of footwear 25 is defined as the thinnest portion of the article of footwear 25 measured across a second line 76 that is perpendicular with respect to the longitudinal axis 46. The heel region 38 extends from the thinnest portion 74 to the rear distal end 48 of the article of footwear 25.

The medial side 44 begins at the front distal end 50 and bows outward along an inner side of the article of footwear 25 along the forefoot region 34 toward the midfoot region 36. The medial side 44 reaches the first line 70, at which point the medial side 44 bows inward, toward the central, longitudinal axis 46. The medial side 44 extends from the first line 70, i.e., the widest portion 68, toward the second line 76, i.e., the thinnest portion 74, at which point the medial side 44 enters into the midfoot region 36, i.e., upon crossing the first line 70. Once reaching the second line 76, the medial side 44 bows outward, away from the longitudinal, central axis 46, at which point the medial side 44 extends into the heel region 38, i.e., upon crossing the second line 76. The medial side 44 then bows outward and then inward toward the rear distal end 48 and terminates at a point where the medial side 44 meets the longitudinal, center axis 46.

The lateral side 42 begins at the front distal end 50 and bows outward along an outer side of the article of footwear 25 along the forefoot region 34 toward the midfoot region 36. The lateral side 42 reaches the first line 70, at which point the lateral side 42 bows inward, toward the longitudinal, central axis 46. The lateral side 42 extends from the first line 70, i.e., the widest portion 68, toward the second line 76, i.e., the thinnest portion 74, at which point the lateral side 42 enters into the midfoot region 36, i.e., upon crossing the first line 70. Once reaching the second line 76, the lateral side 42 bows outward, away from the longitudinal, central axis 46, at which point the lateral side 42 extends into the heel region 38, i.e., upon crossing the second line 76. The lateral side 42 then bows outward and then inward toward the rear distal end 48 and terminates at a point where the lateral side 42 meets the longitudinal, center axis 46.

It should be understood that numerous modifications may be apparent to those skilled in the art in view of the foregoing description, and individual components thereof, may be incorporated into numerous articles of footwear. Accordingly, aspects of the article of footwear 25 and components thereof, may be described with reference to general areas or portions of the article of footwear 25, with an understanding the boundaries of the forefoot region 34, the midfoot region 36, the heel region 38, the medial side 44, and/or the lateral side 42 as described herein may vary between articles of footwear.

However, aspects of the article of footwear 25 and individual components thereof, may also be described with reference to exact areas or portions of the article of footwear 25 and the scope of the appended claims herein may incorporate the limitations associated with these boundaries of the forefoot region 34, the midfoot region 36, the heel region 38, the medial side 44, and/or the lateral side 42 discussed herein.

With continued reference to FIGS. 2-5, the sole assembly 30 is connected or secured to the upper 28 and extends between a foot of a user and the ground when the article of footwear 25 is worn by the user. The sole assembly 30 may also include one or more components, which may include an outsole, a midsole, a heel, a vamp, a stiffening member (e.g., a carbon plate) and/or an insole. For example, in some embodiments, a sole assembly may include an outsole that provides structural integrity to the sole assembly, along with providing traction for a user, a midsole that provides a cushioning system, and an insole that provides support for an arch of a user.

The sole assembly 30 may be characterized by an outsole or outsole region 78, a midsole or a midsole region 80, and the insole or insole region 52. The outsole 78, the midsole 80, and the insole 52, and/or any components thereof, may include portions within the forefoot region 34, the midfoot region 36, and/or the heel region 38. Further, the outsole 78, the midsole 80, and the insole 52, and/or any components thereof, may include portions on the lateral side 42 and/or the medial side 44.

In other instances, the outsole 78 may be defined as a portion of the sole assembly 30 that at least partially contacts an exterior surface, e.g., the ground, when the article of footwear 25 is worn. The insole 52 may be defined as a portion of the sole assembly 30 that at least partially contacts a user's foot when the article of footwear is worn. Finally, the midsole 80 may be defined as at least a portion of the sole assembly 30 that extends between and connects the outsole 78 with the insole 52. In some embodiments, the outsole 78 may be fabricated from an injection molded thermoplastic material (e.g., thermoplastic polyurethane), a molded polyurethane material, or a rubber material. In some embodiments, the outsole 78 may define a shore A hardness between about 55 and about 75.

As described herein, the sole assembly 30 may be connected or secured to the upper 28. Many conventional footwear uppers are formed from multiple elements, e.g., textiles, polymer foam, polymer sheets, leather, and/or synthetic leather, which are joined through bonding or stitching at a seam. In some embodiments, the upper 28 of the articles of footwear 25 is formed from a knitted structure or knitted components. In various embodiments, a knitted component may incorporate various types of yarn that may provide different properties to an upper. For example, one area of the upper 28 may be formed from a first type of yarn that imparts a first set of properties, and another area of the upper 28 may be formed from a second type of yarn that imparts a second set of properties. Using this configuration, properties of the upper 28 may vary throughout the upper 28 by selecting specific yarns for different areas of the upper 28. In some embodiments, the article of footwear 25 may include a first or mesh layer and a second or base layer. The base layer may include multiple layers, such as an outer surface 88 upon which a plurality of eyelets 90 may be provided, and an interior surface 92 that engages with a foot when a user puts on the article of footwear 25. The mesh layer and the base layer may be connected at one or more locations along the article of footwear 25.

With reference to the material(s) that comprise the upper 28, the specific properties that a particular type of yarn will impart to an area of a knitted component may at least partially depend upon the materials that form the various filaments and fibers of the yarn. For example, cotton may provide a soft effect, biodegradability, or a natural aesthetic to a knitted material. Elastane and stretch polyester may each provide a knitted component with a desired elasticity and recovery. Rayon may provide a high luster and moisture absorbent material, wool may provide a material with an increased moisture absorbance, nylon may be a durable material that is abrasion-resistant, and polyester may provide a hydrophobic, durable material.

Other aspects of a knitted component may also be varied to affect the properties of the knitted component and provide desired attributes. For example, a yarn forming a knitted component may include monofilament yarn or multifilament yarn, or the yarn may include filaments that are each formed of two or more different materials. In addition, a knitted component may be formed using a particular knitting process to impart an area of a knitted component with particular properties. Accordingly, both the materials forming the yarn and other aspects of the yarn may be selected to impart a variety of properties to particular areas of the upper 28.

In some embodiments, an elasticity of a knit structure may be measured based on comparing a width or length of the knit structure in a first, non-stretched state to a width or length of the knit structure in a second, stretched state after the knit structure has a force applied to the knit structure in a lateral direction. In further embodiments, the upper 28 may also include additional structural elements. For example, in some embodiments, a heel plate or cover (not shown) may be provided on the heel region 38 to provide added support to a heel of a user. In some instances, other elements, e.g., plastic material, logos, trademarks, etc., may also be applied and fixed to an exterior surface using glue or a thermoforming process. In some embodiments, the properties associated with the upper 28, e.g., a stitch type, a yarn type, or characteristics associated with different stitch types or yarn types, such as elasticity, aesthetic appearance, thickness, air permeability, or scuff-resistance, may be varied.

In the illustrated embodiment, as shown at least in FIGS. 2 and 3, the upper 28 extends upwardly from the sole assembly 30 and defines the interior cavity 32 that receives and secures a foot of a user. The upper 28 may be defined by a foot region 84 and an ankle region 86. In general, the foot region 84 extends upwardly from the sole assembly 30 and through the forefoot region 34, the midfoot region 36, and the heel region 38. The ankle region 86 is primarily located in the heel region 38; however, in some embodiments, the ankle region 86 may partially extend into the midfoot region 36.

Figure 4:
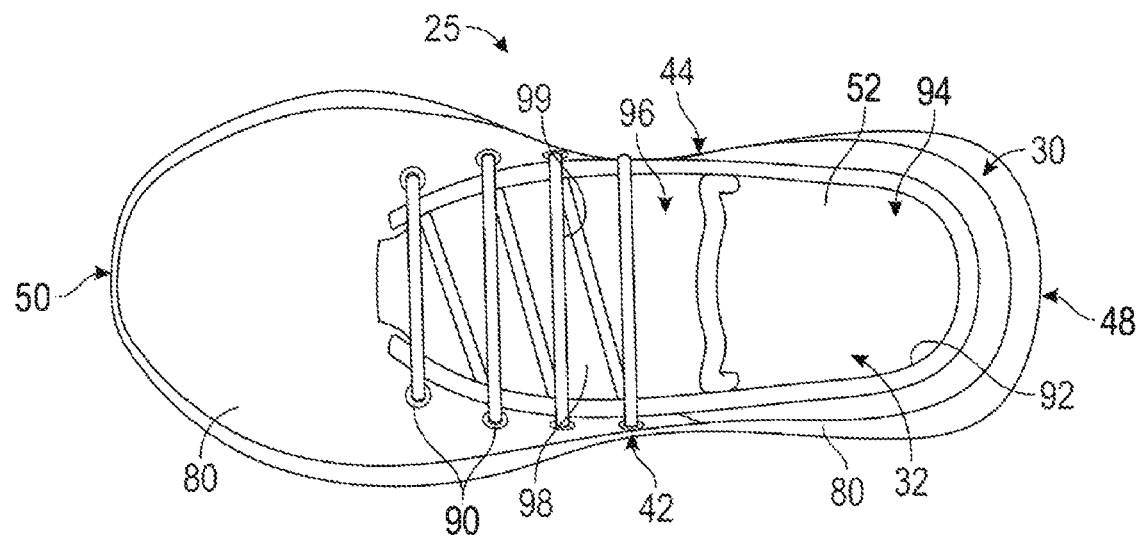
FIG. 4 is a top view of the article of footwear of FIG. 2.

The upper 28 extends along the lateral side 42 and the medial side 44 as shown in FIG. 4, and across the forefoot region 34, the midfoot region 36, and the heel region 38 as shown in FIG. 5 to house and enclose a foot of a user. When fully assembled, the upper 28 also includes an interior surface 92 and an outer surface 88, as shown in FIG. 4. The interior surface 92 faces inward and generally defines the interior cavity 32, and the outer surface 88 of the upper 28 faces outward and generally defines an outer perimeter or boundary of the upper 28. The interior surface 92 and the outer surface 88 may comprise portions of the base and/or mesh layers disclosed above. The upper 28 also includes an opening 94 that is at least partially located in the heel region 38 of the article of footwear 25, that provides access to the interior cavity 32 and through which a foot may be inserted and removed. In some embodiments, the upper 28 may also include an instep area 96 that extends from the opening 94 in the heel region 38 over an area corresponding to an instep of a foot to an area adjacent the forefoot region 34. The instep area 96 may comprise an area similar to where a tongue 98 of the present embodiment is disposed. In some embodiments, the upper 28 does not include the tongue 98, i.e., the upper 28 is tongueless.

As further shown in FIG. 4, a lace 99 may be threaded through a plurality of eyelets 90. The lace 99 may be manipulated by a user to allow the user to modify dimensions of the upper 28, e.g., to tighten or loosen portions of the upper 28, around a foot as desired by the user. In some embodiments, the article of footwear 25 may not be provided with a manually operated lace 99 and may instead include an automatic lacing system that is electronically operated. In some embodiments, an article of footwear may not include a lace, and dimensions of the upper can be modified through other mechanisms as, for example, through hook and loop fasteners. In some embodiments, an elasticity of the upper can allow the upper to conform to a shoe of a user, and an article of footwear need not include elements for modifying dimensions of the upper. As described herein, a sole assembly may provide cushioning to a user wearing an article of footwear. In general, sole assemblies are manufactured or formed using a mold and the finished components (e.g., outsole, midsole, etc.) are required to be demolded and removed from the mold prior to assembling into an article of footwear. The demolding requirement of the formed components significantly restricts the geometry of the sole assembly and the mold. For example, the inclusion of undercuts (i.e., an indentation or protrusion in the sole assembly that can prevent withdrawal of the sole assembly from a mold) is not possible with conventional molding processes. Further, apertures, openings, interconnected winding channels, or other recesses that are not formed in a demolding direction are prohibitively complex to produce with conventional molding technologies.

Figure 6:
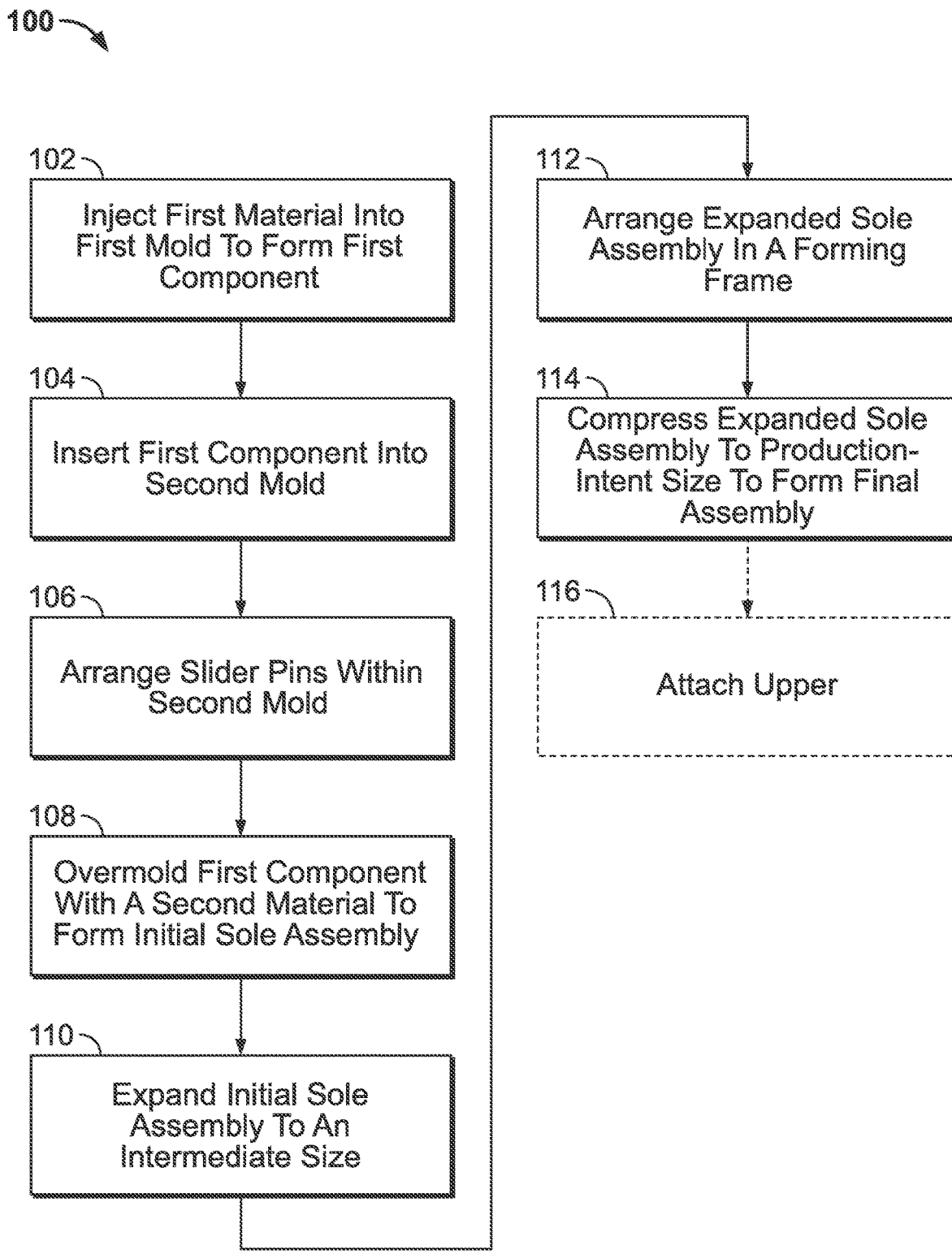
FIG. 6 is a flowchart outlining the steps in a method for manufacturing a sole assembly for an article of footwear.
Figure 7:
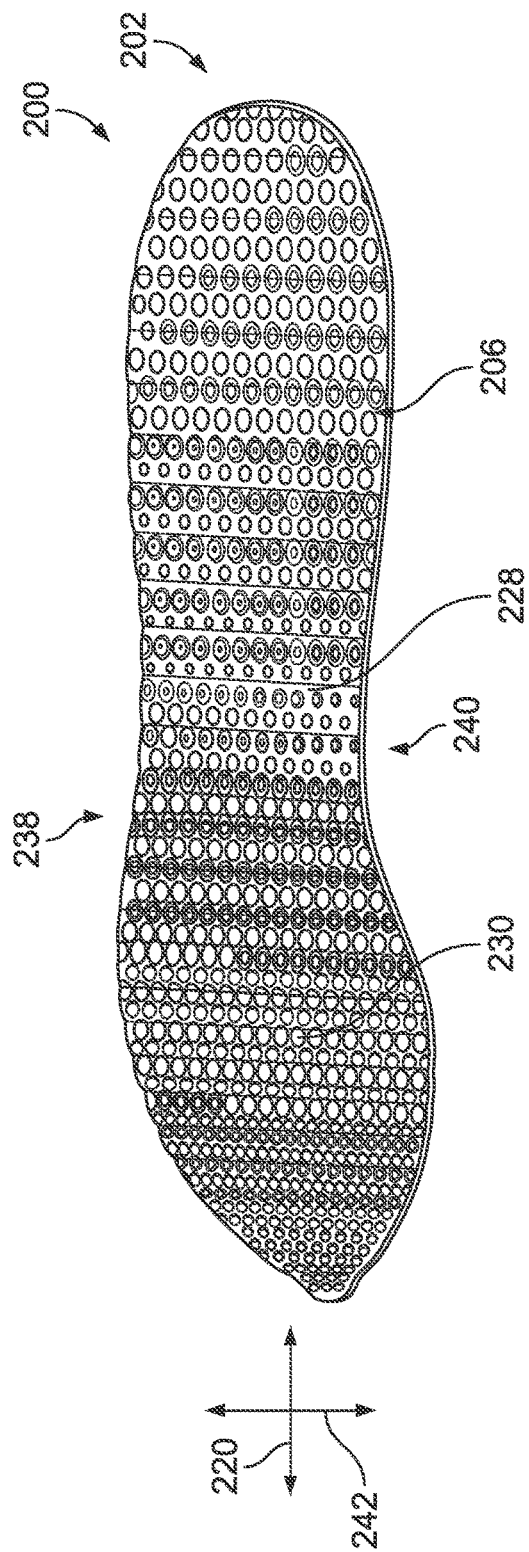
FIG. 7 is a bottom view of a sole assembly including an array of channels.
Figure 8:
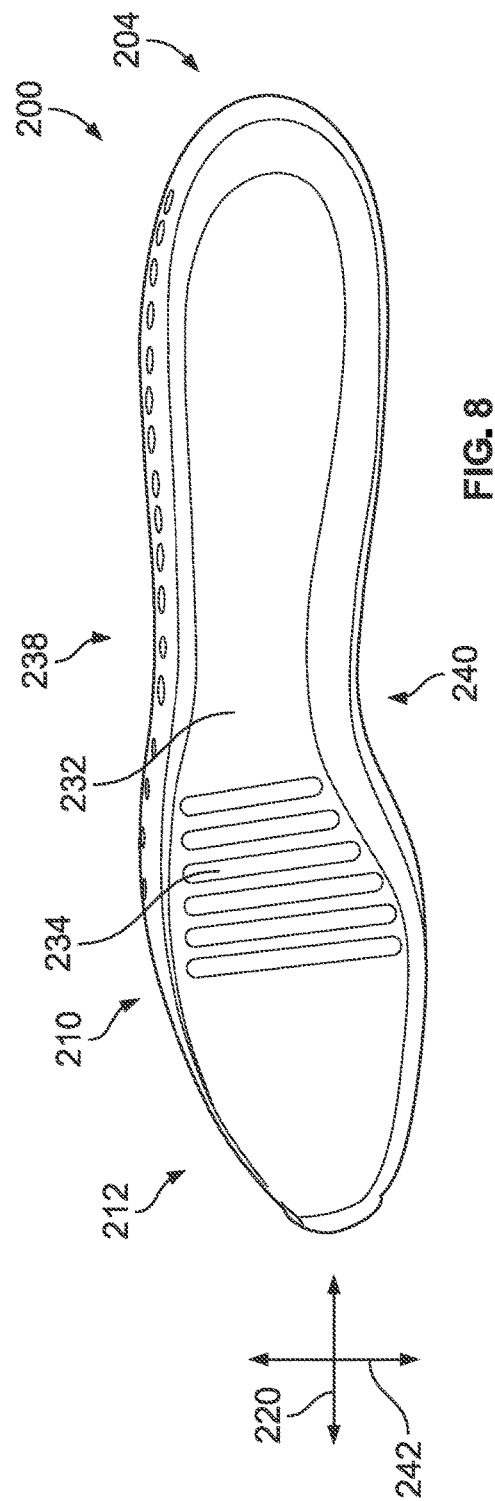
FIG. 8 is a top view of the sole assembly of FIG. 7.
Figure 9:
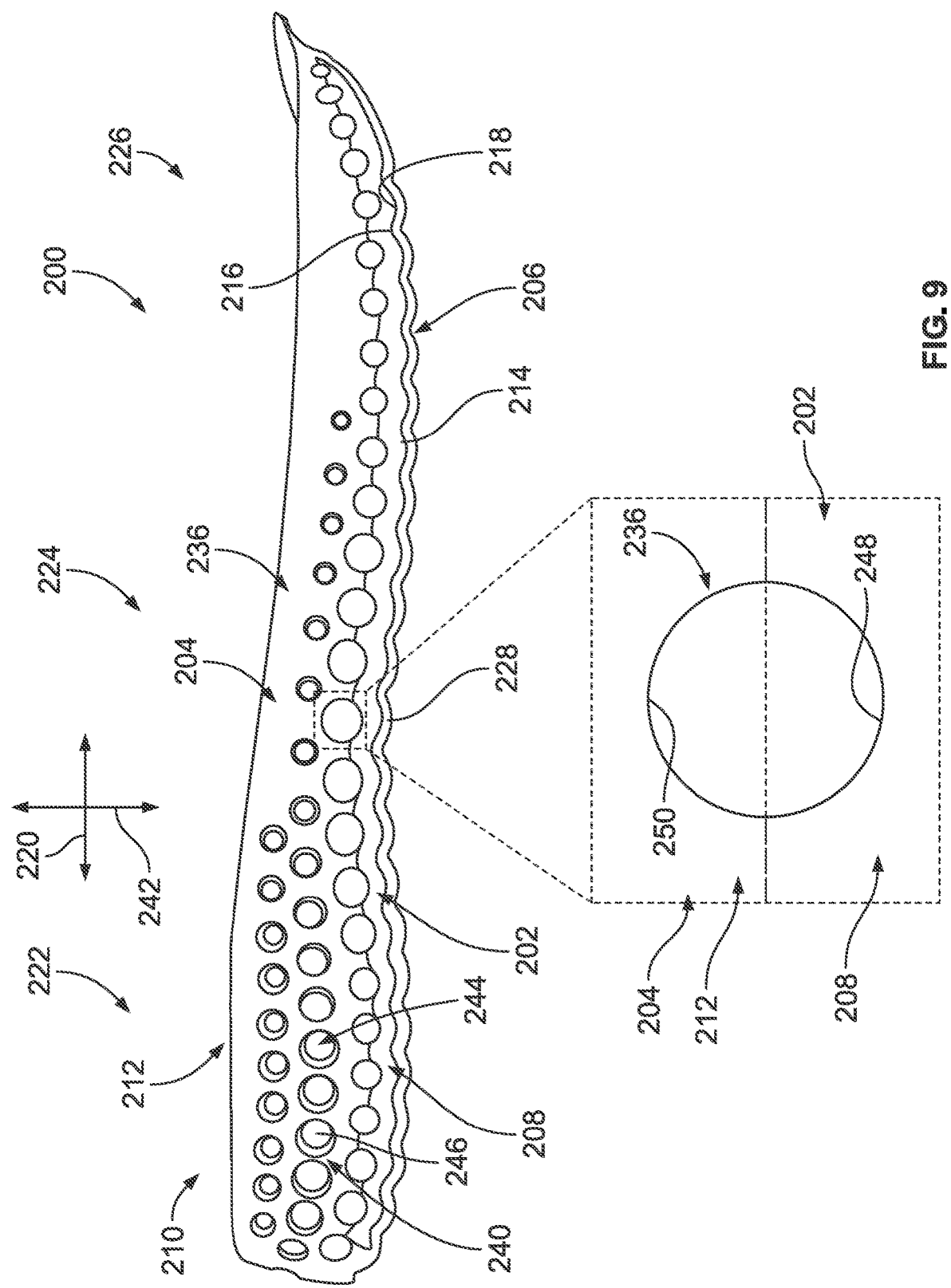
FIG. 9 is a medial side view of the sole assembly of FIG. 7.

FIGS. 7-9 illustrate an embodiment of a sole assembly 200 according to one aspect of the present disclosure. In some embodiments, the sole assembly 200 may be formed using processes and techniques described herein (e.g., process 100 shown in FIG. 6). In some embodiments, as shown in FIG. 9, the sole assembly 200 may be formed from a first component 202 and a second component 204. The first and second components 202, 204 can be respective layers of the sole assembly 200, and, as used herein, the terms "layer" and "component" are used interchangeably. In the illustrated embodiment, the first component 202 includes an outsole 206 and a first portion 208 of a midsole 210. In some embodiments, the first component 202 may include the first portion 208 of the midsole 210 and the outsole 206 may be attached to the sole assembly 200 after the sole assembly 200 is formed. In the illustrated embodiment, the second component 204 includes a second portion 212 of the midsole 210.

In some embodiments, the first component 202 or a portion thereof may be fabricated from a thermoplastic material, e.g., thermoplastic polyurethane, ethylene-vinyl acetate, nylon, nylon polyamide, thermoplastic elastomer, thermoplastic polyamide, etc. In some embodiments, the second component 204 may be fabricated from a material that differs in at least one of color, density, hardness, and chemical composition from the first component 202. For example, the first component 202 may be fabricated from a first material, e.g., one of thermoplastic polyurethane, ethylene-vinyl acetate, nylon, nylon polyamide, thermoplastic elastomer, thermoplastic polyamide, etc., and the second component 204 may be fabricated from a second material that is different than the first material, e.g., a different one of thermoplastic polyurethane, ethylene-vinyl acetate, nylon, nylon polyamide, thermoplastic elastomer, thermoplastic polyamide, etc., or a different color of the same chemical composition.

In the illustrated embodiment, the outsole 206 is attached to a bottom surface 214 of the midsole 210 and defines a generally wavy pattern. For example, the outsole 206 may include a plurality of rounded protrusions 216 and a plurality of recesses 218 formed between adjacent pairs of the plurality of rounded protrusions 216 to define a wave-like pattern along the outsole 206. In the illustrated embodiment, the wave-like pattern extends along the outsole 206 in a heel-toe direction 220 from a heel region 222 through a midfoot region 224 and into a forefoot region 226. In some embodiments, as shown in FIG. 7, an outer surface 228 of the outsole 206 may define a tread pattern. In the illustrated embodiment, the outer surface 228 defines an array of tread protrusions 230 extending from the outer surface 228. In other embodiments, the outer surface 228 may define a different tread pattern, or may define a smooth, uninterrupted profile.

Referring now to FIG. 8, in some embodiments, the sole assembly 200 includes an upper surface 232 that is formed on the second component or layer 204. In general, the upper surface 232 may receive an upper to form an article of footwear that includes the sole assembly 200. In the illustrated embodiment, the upper surface 232 includes a plurality of grooves 234 extending laterally along the upper surface 232. The grooves 234 are spaced from one another in the heel-toe direction 220. In the illustrated embodiment, the grooves 234 are at least partially arranged within the midfoot region 224 and the forefoot region 226 (e.g., as shown in FIG. 9), and the grooves 234 may provide increased flexibility to the sole assembly 200.

With specific reference to FIG. 9, the sole assembly 200 includes a plurality of channels 236 that extend laterally through the sole assembly 200. For example, each of the plurality of channels 236 may extend laterally through the midsole 210 between a lateral side 238 and a medial side 240 (not shown in FIG. 9 but illustrated in FIGS. 7 and 8). In the illustrated embodiment, the plurality of channels 236 define a generally cylindrical shape and extend along the sole assembly 200 in the heel-toe direction 220 from the heel region 222 to the forefoot region 226. In the illustrated embodiment, the plurality of channels 236 defines an array of channels that includes channels that are spaced in both the heel-toe direction 220 and a sole-upper direction 242.

In the illustrated embodiments, a portion of the plurality of channels 236 include end caps 244 that cover the ends of the respective channel. For example, a portion of the channels 236 may be open with apertures being arranged at both lateral ends thereof, and another portion of the channels 236 may be closed at the lateral ends thereof by the end caps 244. Each of the channels 236 that is plugged by an end cap 244 may define a recess 246 at the lateral end of the channel 236 that is laterally recessed into the midsole 210.

In general, at least a portion of the plurality of channels 236 may include channels that are formed at an intersection between the first component 202 and the second component 204. For example, each of the plurality of channels 236 at this intersection may be formed by two partial channels, one partial channel being formed in the first component 202 and another partial channel being formed in the second component 204. In the illustrated embodiment, the first component or layer 202 may include a first plurality of partial channels 248 extending laterally across the first component or layer 202. Each of the first plurality of partial channels 248 may define approximately half of a respective one of the channels 236 formed at the intersection between the first component 202 and the second component or layer 204 (e.g., a lower half from the perspective of FIG. 9, with the dashed line extending through the channel illustrating the boundary of the first partial channel 248). Similarly, the second component 204 may include a second plurality of partial channels 250 extending laterally across the second component 204. Each of the second plurality of partial channels 250 may define a remaining half (e.g., an approximate half) of a respective one of the channels 236 formed at the intersection between the first component 202 and the second component 204 (e.g., an upper half from the perspective of FIG. 9, with the dashed line extending through the channel illustrating the boundary of the second partial channel 250). In the illustrated embodiment, each of the first plurality of partial channels 248 aligns with a corresponding one of the second plurality of partial channels 250 to form a complete channel 236 that extends laterally across the sole assembly 200 (e.g., through the midsole 210).

In the illustrated embodiment, the first component or layer 202 engages or attaches to the second component or layer 204 in regions between each of the plurality of channels 236 formed at the intersection between the first component 202 and the second component 204, where the engagement boundary is illustrated by the dash-dot-dash lines in FIG. 9. The first component or layer 202 is bonded to the second component or layer 204 in these engagement regions formed between the plurality of channels 236.

The present disclosure provides systems and methods for forming or manufacturing a sole assembly (e.g., the sole assembly 200 shown in FIGS. 7-9) with complex and customizable geometric features using a molding process that is not limited by design. For example, the systems and methods of the present disclosure provide a molding process that enables the formation of one or more channels that extend through the sole assembly to provide improved comfort and performance as compared to conventional sole assemblies and molding processes.

FIG. 6 illustrates an example process 100 for manufacturing a sole assembly of an article of footwear according to some embodiments of the present disclosure. The process 100 may initiate at block 102 by injecting a first material into a first mold (e.g., mold 300 illustrated in FIG. 10) to form a first component of a sole assembly (e.g., the first component 202 of the sole assembly 200). The first material may include a thermoplastic material, e.g., thermoplastic polyurethane, ethylene-vinyl acetate, nylon, nylon polyamide, thermoplastic elastomer, thermoplastic polyamide, etc. In some embodiments, the first component may be an outsole of an article of footwear (e.g., the outsole 206 shown in FIGS. 7 and 9). In some embodiments, the first component may be a first portion of a midsole of an article of footwear (e.g., a first portion 208 of the midsole 210 shown in FIG. 9). In some embodiments, the first component may be an outsole and a first portion of a midsole formed as a unitary component (e.g., the first component 202 shown in FIG. 9).

The first material may remain within the first mold until it solidifies into the first component (e.g., the first component 202 shown in FIG. 9). In some embodiments, the first mold may include a plurality of first protrusions that extend laterally across the first mold. In these embodiments, each of the plurality of first protrusions is configured to form a partial channel that extends laterally across the first component. The plurality of partial channels may each define a shape that is about half of a completed, enclosed channel. For example, each of the plurality of partial channels may define about half of a circular-, rectangular-, square-, triangular-, oval-, or hexagonally-shaped channel, or any other polygon-shaped channel. In some embodiments, the plurality of partial channels may be spaced along the first component in a heel-toe direction from a heel region to a forefoot region. In some embodiments, the plurality of partial channels may be spaced along the first component in a heel-toe direction from a heel region to a toe region. In some embodiments, the plurality of partial channels may be spaced along the first component in a heel-toe direction within a heel region.

Figure 10:
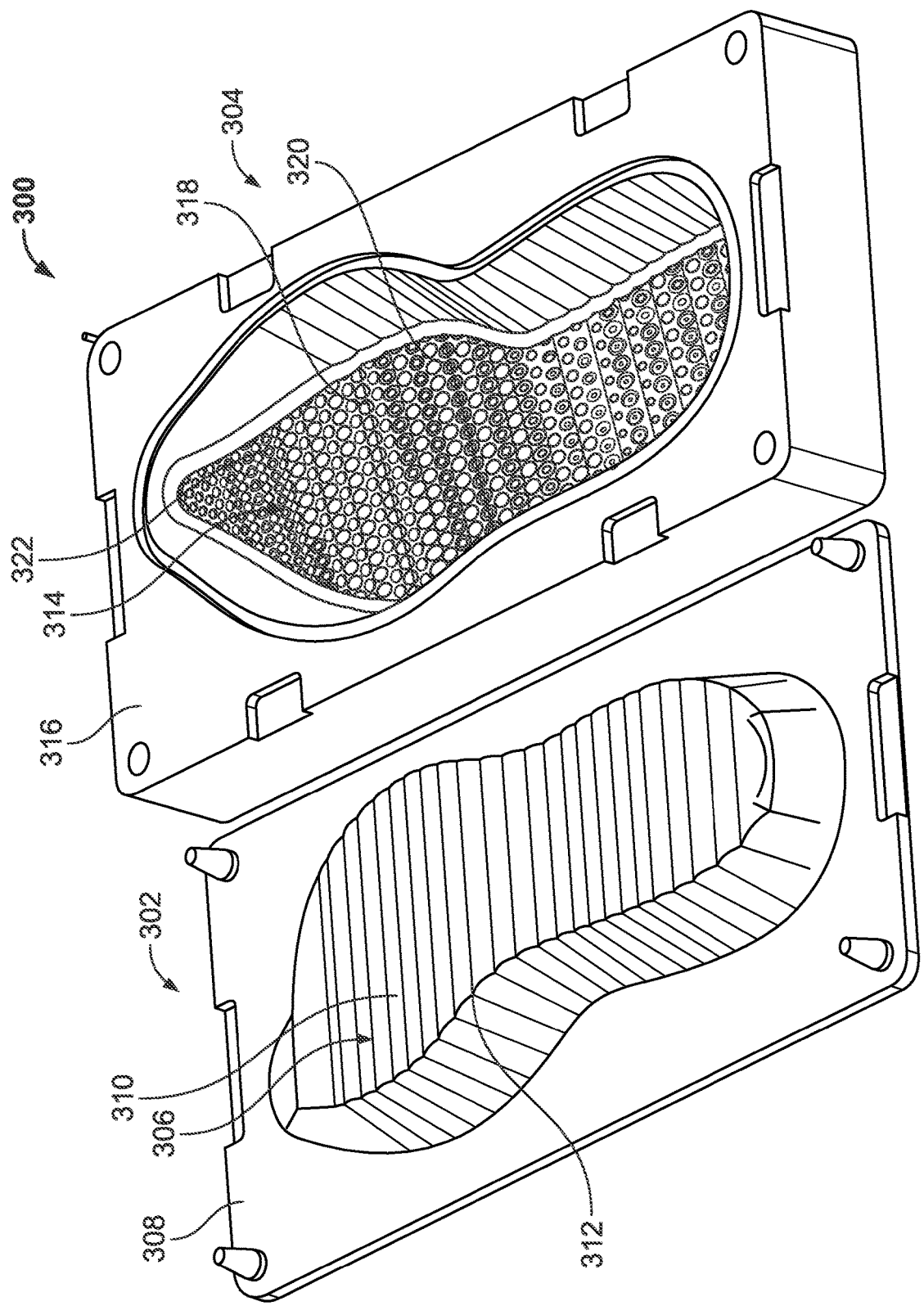
FIG. 10 is a perspective view of a first mold used to manufacture a first component/layer of the sole assembly of FIG. 7.
Figure 11:
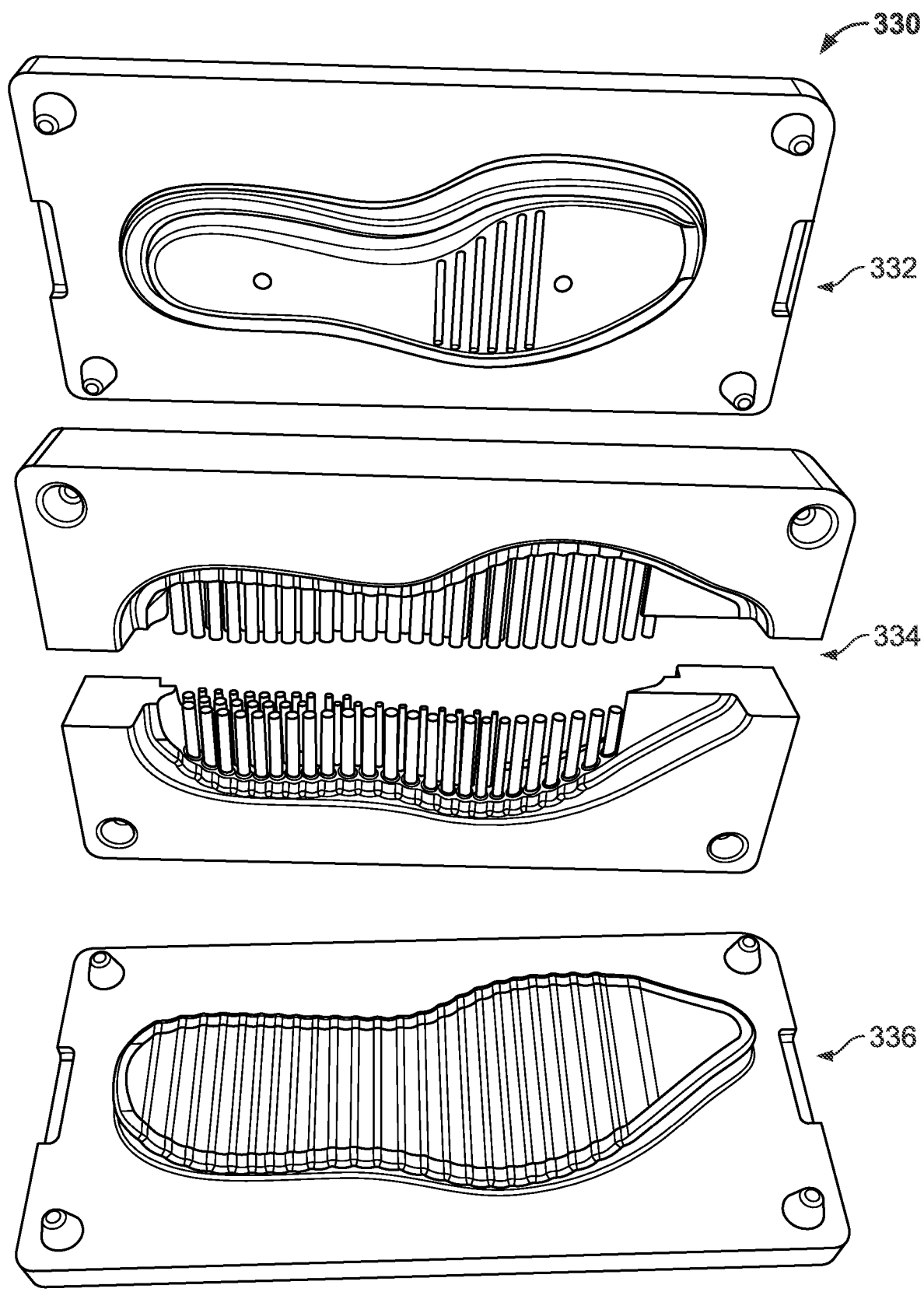
FIG. 11 is an exploded view of a second mold used to manufacture a second component/layer of the sole assembly of FIG. 7.

In this regard, FIG. 10 illustrates one embodiment of a first mold 300 that may be used (e.g., at block 102 of process 100) to form a first component (e.g., the first component 202 shown in FIG. 9). As described with respect to the process 100, in some embodiments, a partial channel may be formed in a first component via a protrusion in the first mold 300. In some embodiments, the first mold 300 may be used to form a first component or layer according to the process 100. In the illustrated embodiment, the first mold 300 includes a first mold insert 302 and a first mold base 304. The first mold insert 302 is configured to be inserted into the first mold base 304 to form a cavity between the first mold insert 302 and the first mold base 304 within which the first material may be injected to form a first component or layer (e.g., first component 202 illustrated in FIGS. 7-9).

In the illustrated embodiment, the first mold insert 302 includes a first insert surface 306 that protrudes outwardly from an upper surface 308 of the first mold insert 302. The first insert surface 306 includes a plurality of first insert protrusions 310 and a plurality of first insert recesses 312 formed between adjacent pairs of the plurality of first insert protrusions 310. The first mold base 304 may include a first base surface 314 that is recessed relative to an upper surface 316 of the first mold base 304. Similar to the first mold insert 302, the first base surface 314 includes a plurality of first base protrusions 318 and a plurality of first base recesses 320 formed between adjacent pairs of the plurality of first base protrusions 318. In the illustrated embodiment, the first base surface 314 also includes a plurality of tread recesses 322, which form a tread pattern on the first component (e.g., the tread protrusions 230 in the first component 202 shown in FIG. 7).

To form the first component 202 (shown in FIGS. 7-9), a first material may be injected into the first mold base 304 and the first mold insert 302 may be inserted into the first mold base 304, so that the first insert surface 306 is received within the cavity formed by the recessed nature of the first base surface 314. With the first mold insert 302 pressed into the first mold base 304, the first insert surface 306 may oppose the first base surface 314 with a gap or cavity arranged therebetween that defines the shape and size of the first component 202. In this pressed configuration, each of the plurality of first insert protrusions 310 may oppose a corresponding one of the first base recesses 320, and each of the plurality of first insert recesses 312 may oppose a corresponding one of the plurality of first base protrusions 318. The engagement of the first material with the first base recesses 320 and first base protrusions 318 can produce the plurality of rounded protrusions 216 and the plurality of recesses 218 in the first component 202. Similarly, the plurality of first insert protrusions 310 and the plurality of first insert recesses 312 can engage the first material to produce the first plurality of partial channels 248 in the first component or layer 202 (as shown in FIG. 9).

Referring back to FIG. 6, once the first component is formed in the first mold, the first component may then be removed from the first mold and inserted into a second mold at block 104 (e.g., the second mold 330 illustrated in FIGS. 11-14). The second mold may include a plurality of second pins extending laterally across an interior of the second mold (e.g., pins 344 shown in FIG. 13). For example, the plurality of second pins may be slidably arranged within the second mold at block 106, so that the plurality of pins extend through the interior of the second mold and each of the plurality of partial channels in the first component receives a corresponding one of the plurality of second pins in the second mold.

With the first component arranged within the second mold, and the plurality of second pins extending through and being received by the plurality of partial channels, the first component may be overmolded with a second material to form a second component or a second layer that, together with the first component or the first layer, form an initial sole assembly at block 108. In some embodiments, the overmolding at block 108 may comprise injecting a second material into the second mold that flows over the first component and around the plurality of second pins. In some embodiments, the second material may be different than the first material. For example, the second material may differ in at least one of color, density, hardness, and chemical composition when compared to the first material. In some embodiments, the second material may be the same as the first material. The second material may include a thermoplastic material, e.g., thermoplastic polyurethane, ethylene-vinyl acetate, nylon, nylon polyamide, thermoplastic elastomer, thermoplastic polyamide, etc. In some embodiments, the second component or layer includes a midsole. In some embodiments, the second component or layer includes a second portion of a midsole.

The first component or layer may be bonded to the second component or the second layer in regions between the completed channels formed in the initial sole assembly. Specifically, in regions between the plurality of second pins, the second material may engage and bond to the first material to attach the first component or layer to the second component or layer.

The plurality of second pins within the second mold form a plurality of channels extending laterally through the initial sole assembly. For example, the plurality of channels may extend through the initial mold assembly from a lateral side to a medial side. Each of the plurality of channels may be formed by a corresponding one of the plurality of partial channels in the first component and a corresponding one of a second plurality of partial channels formed in the second component or the second layer during the overmolding process. Each of a first plurality of partial channels in the first component or first layer may align with a corresponding one of the second plurality of partial channels formed in the second component or the second layer to form a plurality of completed channels extending through the initial sole assembly.

In some embodiments, the plurality of channels defines an array of channels that extend along the initial sole assembly in a heel-toe direction from a heel region to a forefoot region. In some embodiments, the array of channels includes channels that are spaced in a sole-upper direction. In some embodiments, the array of channels includes upper channels that extend through and are arranged on an upper surface of the initial sole assembly.

FIGS. 11-14 illustrate one embodiment of a second mold 330 that may be used at blocks 104, 106, and 108 to form a second component (e.g., the second component 204 shown in FIGS. 7-9) and overmold the first component (e.g., the first component 202 shown in FIGS. 7-9) to form the initial sole assembly. In the illustrated embodiment, the second mold 330 includes a top plate 332, a pair of middle plates 334, and a bottom plate 336. The top plate 332 may be inserted onto a top side of the pair of middle plates 334, and the bottom plate 336 may be inserted onto a bottom side of the middle plates 334, which defines a cavity within the volume enclosed by the top plate 332, the middle plates 334, and the bottom plate 336. The cavity defined by this enclosed volume may receive a first component or layer and the second component or layer may be overmolded onto the first component or layer by injecting a material into the remaining volume defined by the cavity.

Figure 12:
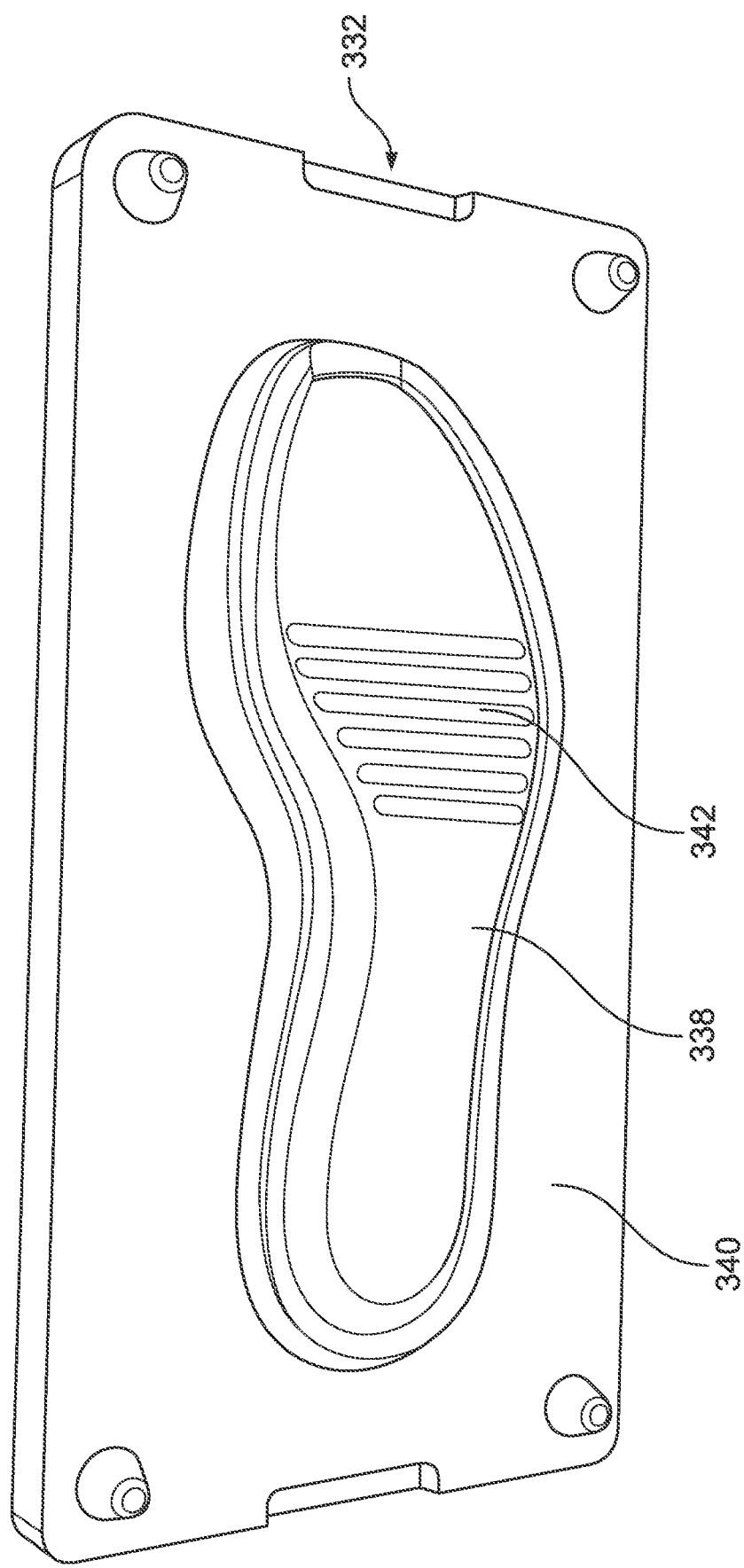
FIG. 12 is a bottom perspective view of a top plate of the second mold of FIG. 11.

With specific reference to FIG. 12, the top plate 332 includes a top mold surface 338 that protrudes outwardly from an upper surface 340 of the top plate 332. The top mold surface 338 includes a plurality of ribs 342 that protrude outwardly from the top mold surface and extend laterally across the top mold surface 338. The plurality of ribs 342 form the plurality of grooves 234 on the upper surface 232 of the initial sole assembly 200, as shown in FIG. 8.

Figure 13:
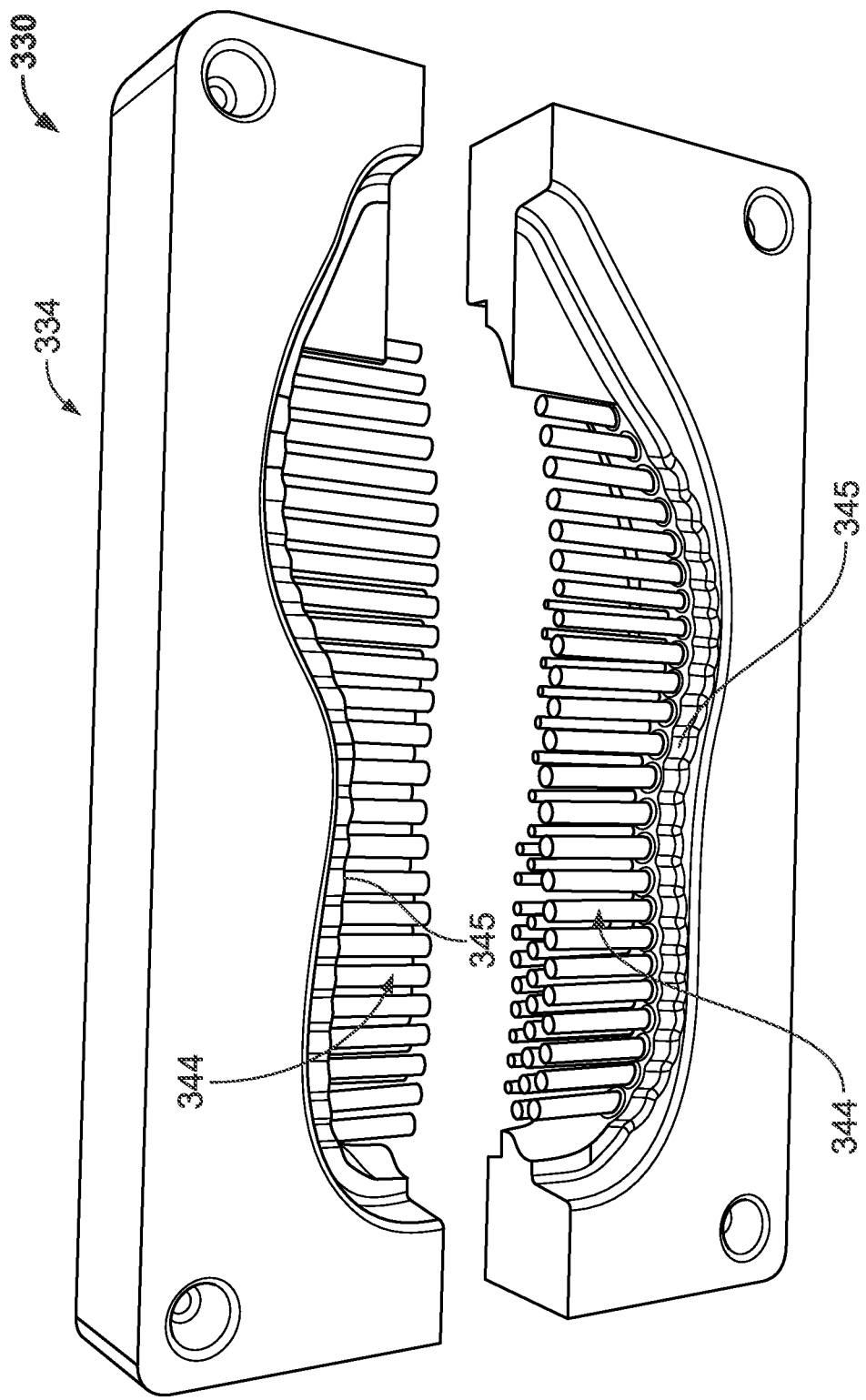
FIG. 13 is a bottom perspective view of middle plates of the second mold of FIG. 11.

Turning to FIG. 13, each of the middle plates 334 include a plurality of pins (e.g., slider pins 344) that extend laterally outwardly from a respective side surface 345 of each of the middle plates 334. The pins 344 extend laterally outwardly from the side surfaces 345 by a distance that ensures that when the second mold 330 is assembled, the distal ends of the pins 344 of one of the middle plates 334 engage the distal ends of the pins of the other middle plate 334 to form an array of continuous pins that extend across the cavity defined by the second mold. In general, the location and size of the pins 344 determine a size and location of the plurality of channels 236 in the initial sole assembly, as shown in FIG. 9. A portion of the pins 344 are positioned to form the channels at the intersection between the first component and the second component. For example, the pins 344 can be arranges to be received within the each of the first plurality of partial channels 248 formed in the first component 202, and to define the second plurality of partial channels 250 when the second material is overmolded to the first component 202 to form the second component.

Figure 14:
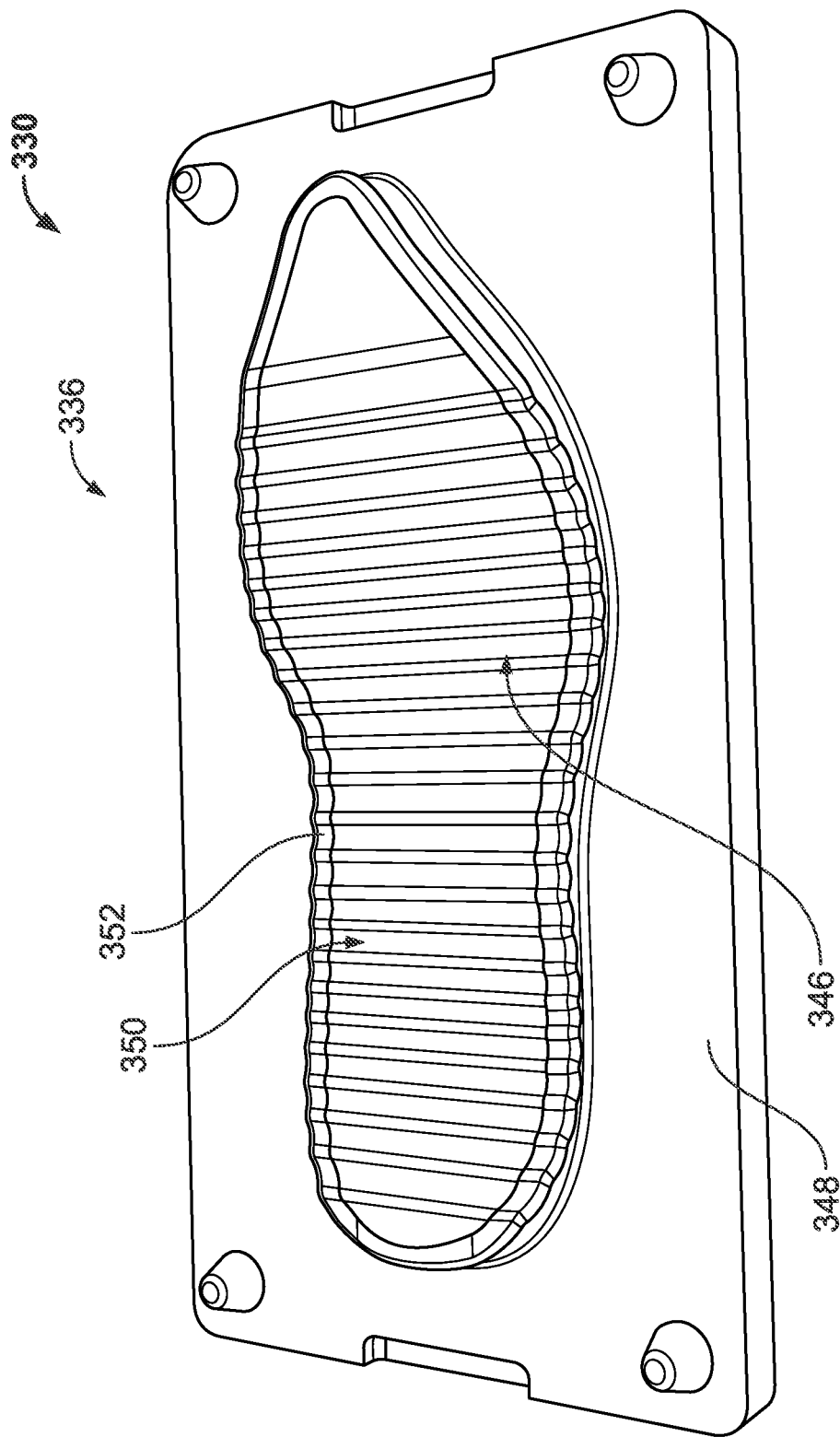
FIG. 14 is a top perspective view of a bottom plate of the second mold of FIG. 11.

In some embodiments, the second mold 330 may include a single middle plate 334, rather than a pair of middle plates 334. For example, if the first component only includes partial channels, e.g., not enclosed channels, then the second mold 330 may include a single middle plate 334. If the pins 344 are required to be inserted through completed channels formed in the first component, then the second mold 330 may include a pair of middle plates 334 to enable each plate to be inserted through the channels in the first component, e.g., one in each end of the channels. In some embodiments, a sole assembly can have more than two components. For example, a second mold can have additional pairs of middle plates to overmold a third component onto a second component. With reference to FIG. 14, the bottom plate 336 includes a bottom mold surface 346 that protrudes outwardly from a lower surface 348 of the bottom plate 336. The bottom mold surface 346 includes a plurality of bottom protrusions 350 and a plurality of bottom recesses 352 formed between adjacent pairs of the plurality of bottom protrusions 350. This structure defined by the plurality of bottom protrusions 350 and the plurality of bottom recesses 352 formed in the bottom mold surface 346 is designed to conform to the structure of the first component or layer 202. For example, the bottom mold surface 346 is configured to receive the first component or layer 202 to arrange the first component or layer 202 within the second mold 330. In other embodiments, a bottom mold surface of a bottom plate can include other patterns to receive first components with different arrangements of protrusions and recesses.

The middle plates 334 may then be inserted onto the bottom plate 336 so that each of the first plurality of partial channels 248 in the first component or layer 202 receives a corresponding one of the plurality of pins 344 in the second mold 330. The top plate 332 may then be inserted onto the middle plates 334 so that the top mold surface 338 opposes the bottom mold surface 346. The volume enclosed between the bottom mold surface 346, the top mold surface 338, the side surfaces 345 of the middle plates 334, and the first component or layer 202 defines a cavity within which the second material may be injected to for the initial sole assembly 200 by overmolding the second component or layer 204 to the first component or layer 202. As the second component or layer 204 is overmolded to the first component or layer 202, the second material injected into the cavity of the second mold 330 may flow around each of the pins 344, which forms the plurality of channels 236 in the initial sole assembly 200, including the second plurality of partial channels 250 that complement the first plurality of partial channels 248.

Once the initial sole assembly 200 is formed (e.g., formed at blocks 104, 106, and 108 of process 100 shown in FIG. 6), the second mold 330 may be disassembled and the formed initial sole assembly 200 may be expanded and compressed according to the process 100 to form the final sole assembly.

In this regard, referring back to FIG. 6, the initial sole assembly may define an initial size (e.g., a volume) that is scaled down (e.g., smaller) relative to a final, production-intent size of a sole assembly. At block 110, the initial sole assembly may be expanded from the initial size to an intermediate size to form an expanded sole assembly. For example, the initial sole assembly may be expanded via a supercritical foaming process by which the initial sole assembly is enclosed in a pressurized autoclave and supplied with pressurized gas (e.g., pressurized on the order of several thousand pounds per square inch). In some embodiments, the gas supplied can be one of nitrogen or carbon dioxide. In some embodiments, other gases can be used in a supercritical foaming process to expand a sole assembly. The pressurized gas within the autoclave may transmit (e.g., enter) into the initial sole assembly. Upon depressurization of the autoclave, a pressure differential between the high-pressure gas in the initial sole assembly and the depressurized autoclave may cause the initial sole assembly to expand from the initial size to the intermediate size. The array of channels in the expanded sole assembly can expand at block 110 to define a larger size than the array of channels in the initial sole assembly, thus providing reduced weight properties and improved cushioning properties to the expanded midsole.

In some embodiments, the initial sole assembly may be scaled down by a scale factor, or define a smaller volume relative to a final, production-intent size (e.g., volume) of a final sole assembly that may be manufactured with an article of footwear (e.g., the article of footwear 25). For example, the size (e.g., a volume) of the initial sole assembly may be about 70% smaller, about 65% smaller, about 60% smaller, about 55% smaller, about 50% smaller, about 45% smaller, about 40% smaller, about 35% smaller, or about 30% smaller than the final, production-intent size of the final sole assembly. In some embodiments, the size of the initial sole assembly may be between about 70% and about 30% smaller, between about 65% and about 35% smaller, or between about 60% and about 40% smaller than the final, production-intent size of the final sole assembly. In some embodiments, the initial size of the initial sole assembly may be between about 70% and about 60% smaller, between about 50% and about 40% smaller, or between about 30% and about 20% smaller than the final, production-intent size of the final sole assembly.

In some embodiments, the scale factors for the size of the initial sole assembly relative to the final sole assembly are uniform (e.g., dimensions of the initial sole assembly can be scaled down by the same scale factor about all coordinate axes defined by the sole assembly). In some embodiments, the scale factors described herein may vary or define a gradient across the sole assembly. For example, some portions of the initial sole assembly may be scaled down in volume relative to the final sole assembly more or less than other portions of the sole assembly. In some embodiments, the mass properties (e.g., density) of portions of the formed final sole assembly may determine the magnitude of the scale factor (e.g., may determine a magnitude of expansion of the final sole assembly relative to the initial sole assembly) relative to corresponding portions of the initial sole assembly. For example, portions of the initial sole assembly with greater densities or thicknesses can expand by a smaller scale factor relative to portions with lower thicknesses or densities.

In some embodiments, a gradient defined by the scale factor may correlate to a geometric characteristic of the final sole assembly (e.g., thickness, volume, or a geometric property defined along at least one coordinate axis), with areas that define a larger geometric characteristic being scaled down more than areas that define a smaller geometric characteristic, so that those areas are expanded more in the final sole assembly than in the initial sole assembly. In some embodiments, the scale factors described herein may scale down the initial sole assembly in one direction or along one coordinate axis defined by the midsole. For example, the initial sole assembly may be structurally supported by a mold base or frame to prevent expansion along two directions (e.g., along an x-axis and a z-axis, or along a plane that is parallel to a ground plane that an article of footwear rests upon while being worn by a user), and the size of the initial sole assembly may be approximately equal to the final size of the final sole assembly along these two directions. The initial sole assembly, with the scaled-down size in one direction, may then be expanded along the one direction that is allowed by the mold base or frame (e.g., a y-axis or the coordinate axis that is perpendicular to a ground upon which a user walks).

Still referring to FIG. 6, at block 112, the expanded sole assembly may then be arranged within a forming frame. In some embodiments, the forming frame defines a size, shape, and structure that is similar to the second mold, except that the forming frame includes a plurality of frame pins, each frame pin having a smaller diameter, or size, than the diameter of a corresponding one of the channels 136. In some embodiments, the plurality of frame pins can have a smaller diameter than the diameter of the of second pins in the second mold. When the intermediate sole assembly (e.g., the expanded sole assembly resulting from block 110 of process 100) is be arranged within the forming frame, the plurality of frame pins may be inserted into and through the plurality of channels in the intermediate sole assembly.

At block 114, the expanded sole assembly is compressed by applying mechanical pressure to the expanded sole assembly (e.g., while the expanded sole assembly is within the forming frame) to compress the expanded sole assembly to a final size that is smaller than the intermediate size and to form a final sole assembly. The plurality of frame pins may prevent collapse of the plurality of channels in the sole assembly during the compression, and the smaller size defined by the plurality of frame pins, relative to the plurality of second pins, allows the plurality of channels to shrink down to the final size of the channels, which is smaller than the intermediate, or expanded size of the channels formed at block 110. In some embodiments, each of the plurality of channels formed in the final sole assembly may be spaced from an adjacent channel by a maximum of about five millimeters in a heel-toe direction, which improves structural integrity of the final sole assembly and provides increased comfort to a wearer. With the final sole assembly formed at block 114, the final sole assembly may be attached to an upper to form an article of footwear at block 116.

Figure 15:
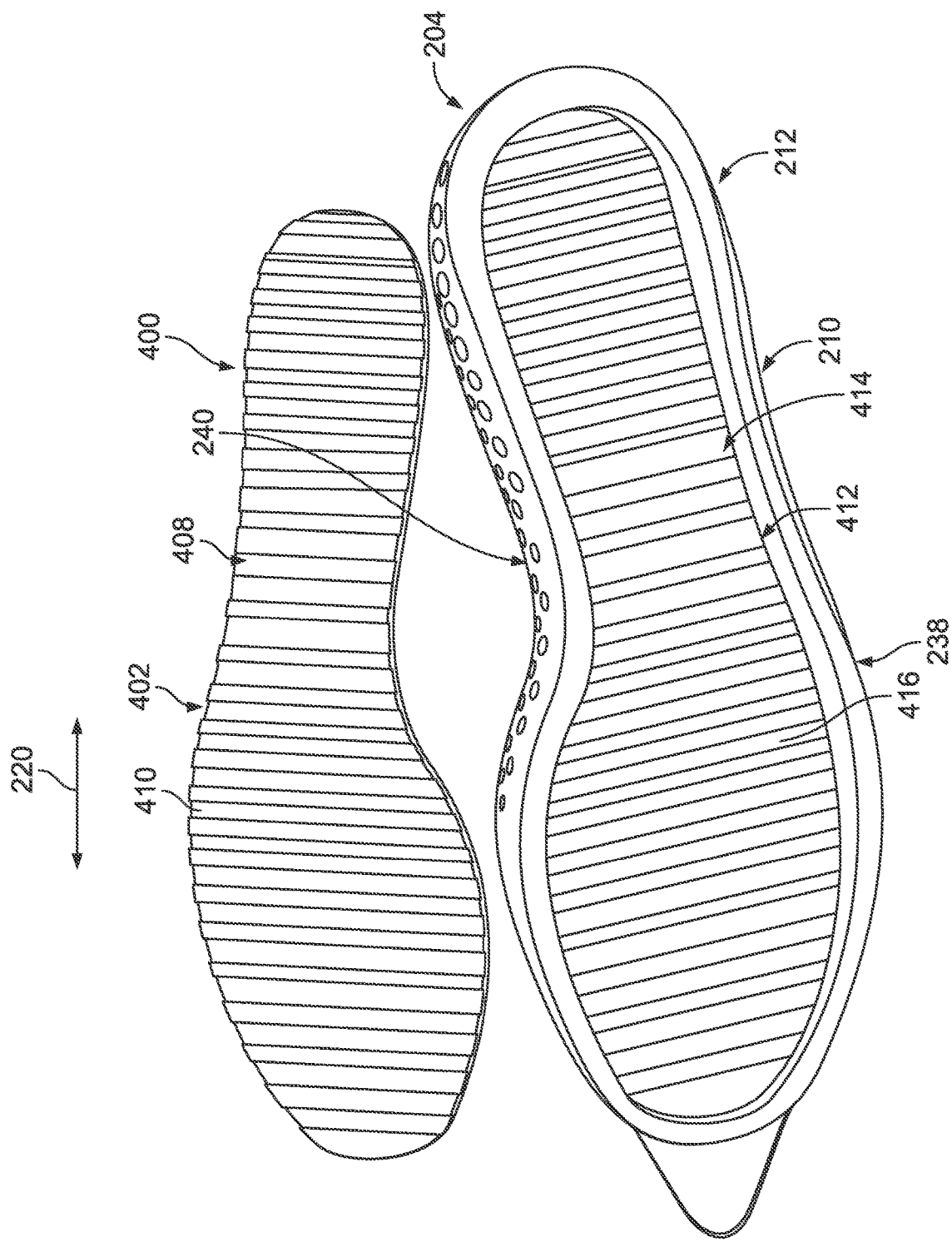
FIG. 15 is an exploded view of a sole assembly including a drop-in component.
Figure 16:
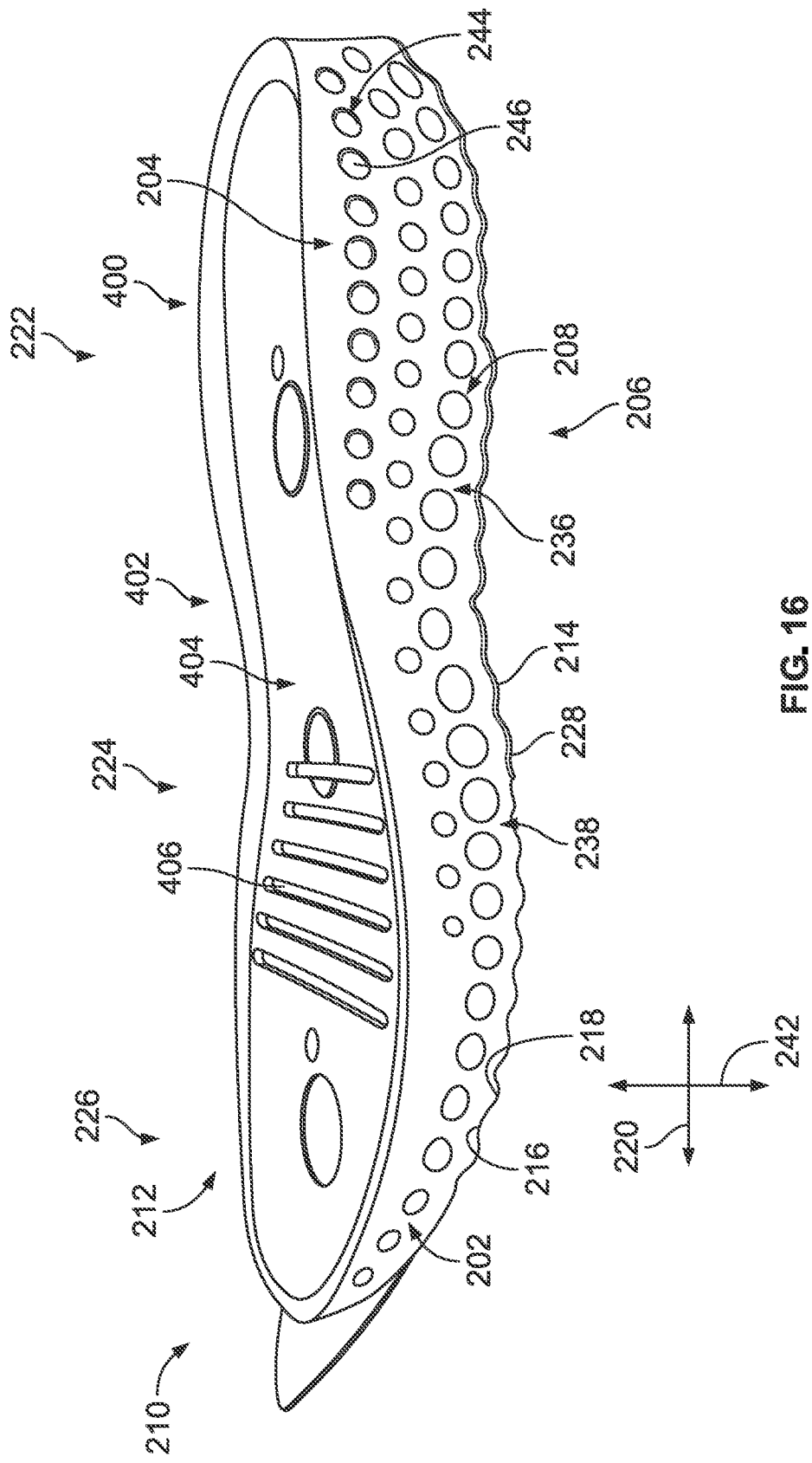
FIG. 16 is a top perspective view of the sole assembly of FIG. 15 with the drop-in component inserted into the sole assembly.

FIGS. 15 and 16 illustrate another embodiment of a sole assembly 400 according to one aspect of the present disclosure. In general, the sole assembly 400 may be similar to the sole assembly 200, with like features identified using the same reference numerals, except as described herein or as apparent from the figures. In the illustrated embodiment, sole assembly 400 includes a drop-in component or an upper midsole insert 402. In some embodiments, the sole assembly 400 may be formed from the process outlined in the process 100. In some embodiments, producing the sole assembly 400 includes forming the drop-in component 402 in a drop-in mold that includes a top mold surface (e.g., similar to the top mold surface 338 shown in FIG. 12) and a bottom surface that includes a plurality of protrusions that form partial channels in the drop-in component 402.

In the illustrated embodiment, the drop-in component 402 includes an upper surface 404 having a plurality of grooves 406 extending laterally along the upper surface 404 (see FIG. 16). The grooves 406 are spaced from one another in the heel-toe direction 220. In the illustrated embodiment, the grooves 406 are at least partially arranged within the midfoot region 224 and the forefoot region 226. In general, the grooves 406 may provide increased flexibility to the sole assembly 400. The drop-in component 402 includes a bottom surface 408 having a plurality of partial drop-in channels 410 extending laterally across the bottom surface 408 (see FIG. 15).

In the illustrated embodiment, the sole assembly 400 defines an upper cavity 412 formed in an upper surface 414. In general, the upper cavity 412 is dimensioned to receive the drop-in component 402 therein. The upper surface 414 includes a plurality of upper partial channels 416 that extend laterally across the upper surface 414. The upper partial channels 416 may be formed by the pins 344 in the second mold 330. When the drop-in component 402 is inserted into the upper cavity 412, each of the plurality of upper partial channels 416 aligns with a corresponding one of the plurality of partial drop-in channels 410 to form a completed channel in the array of channels.

Figure 22:
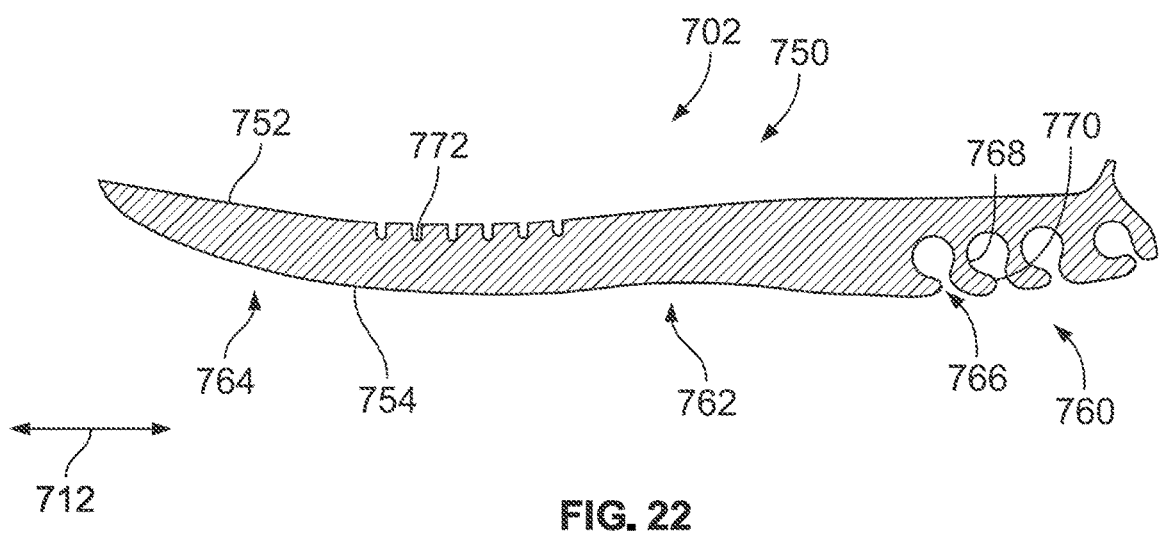
FIG. 22 is a lateral side view of a second component of the sole assembly including a plurality of apertures.
Figure 23:
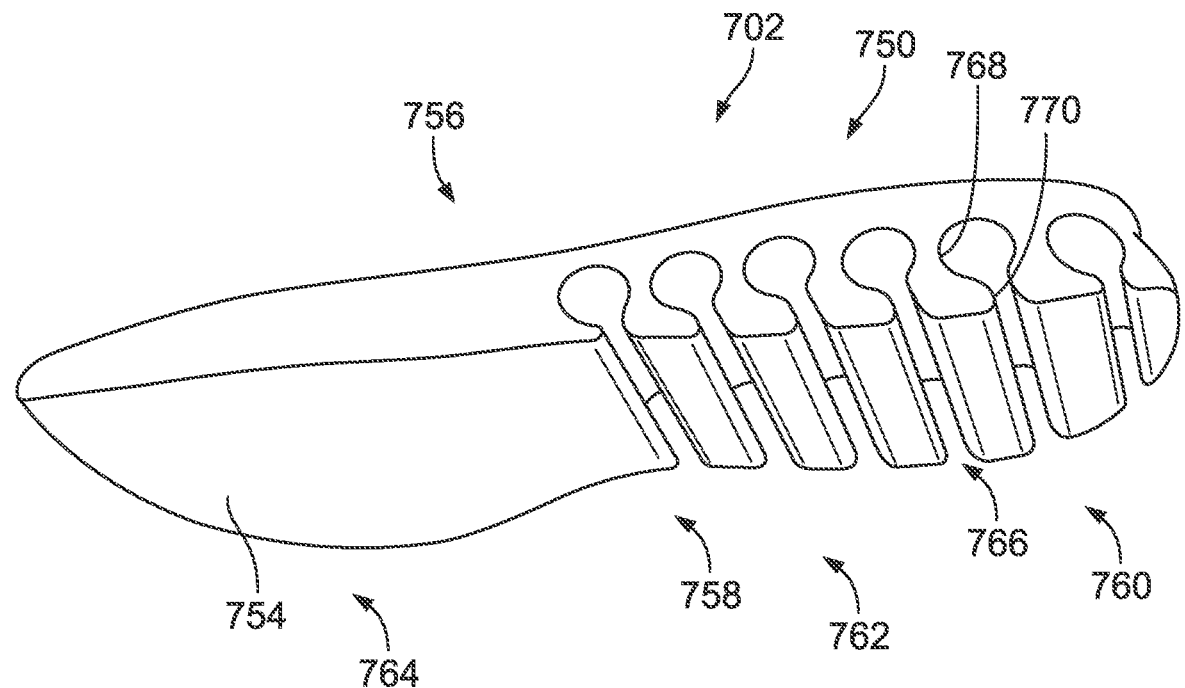
FIG. 23 is a bottom perspective view of the second component of FIG. 22.
Figure 24:
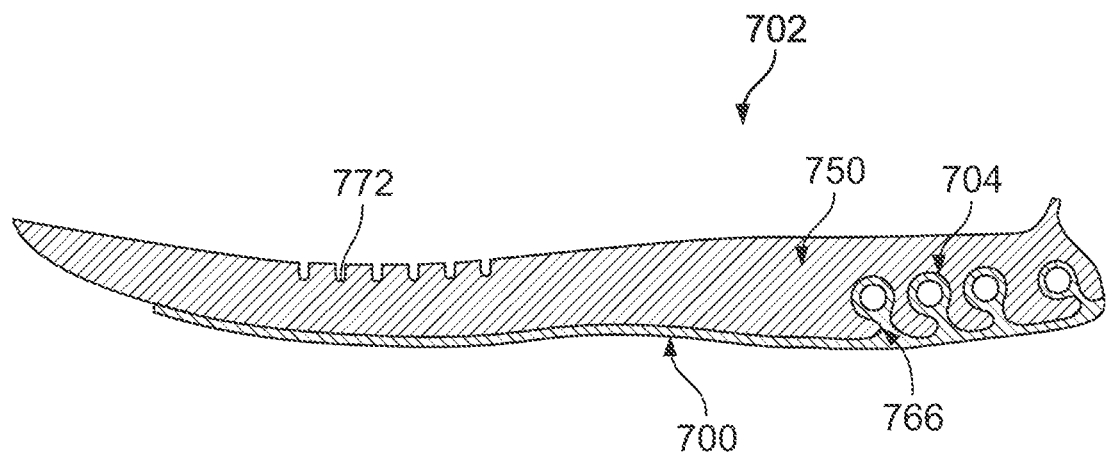
FIG. 24 is a lateral side view of the first component of FIG. 19 installed onto the second component of FIG. 22 to form the sole assembly.

FIGS. 19-24 illustrate another embodiment of a sole assembly 702 according to aspects of the present disclosure. As illustrated in FIG. 24, the sole assembly 702 can include a first component 700 (e.g., an outsole). The sole assembly 702 illustrated also includes a second component 750, and the first component 700 is at least partially received into the second component 750.

Figure 18:
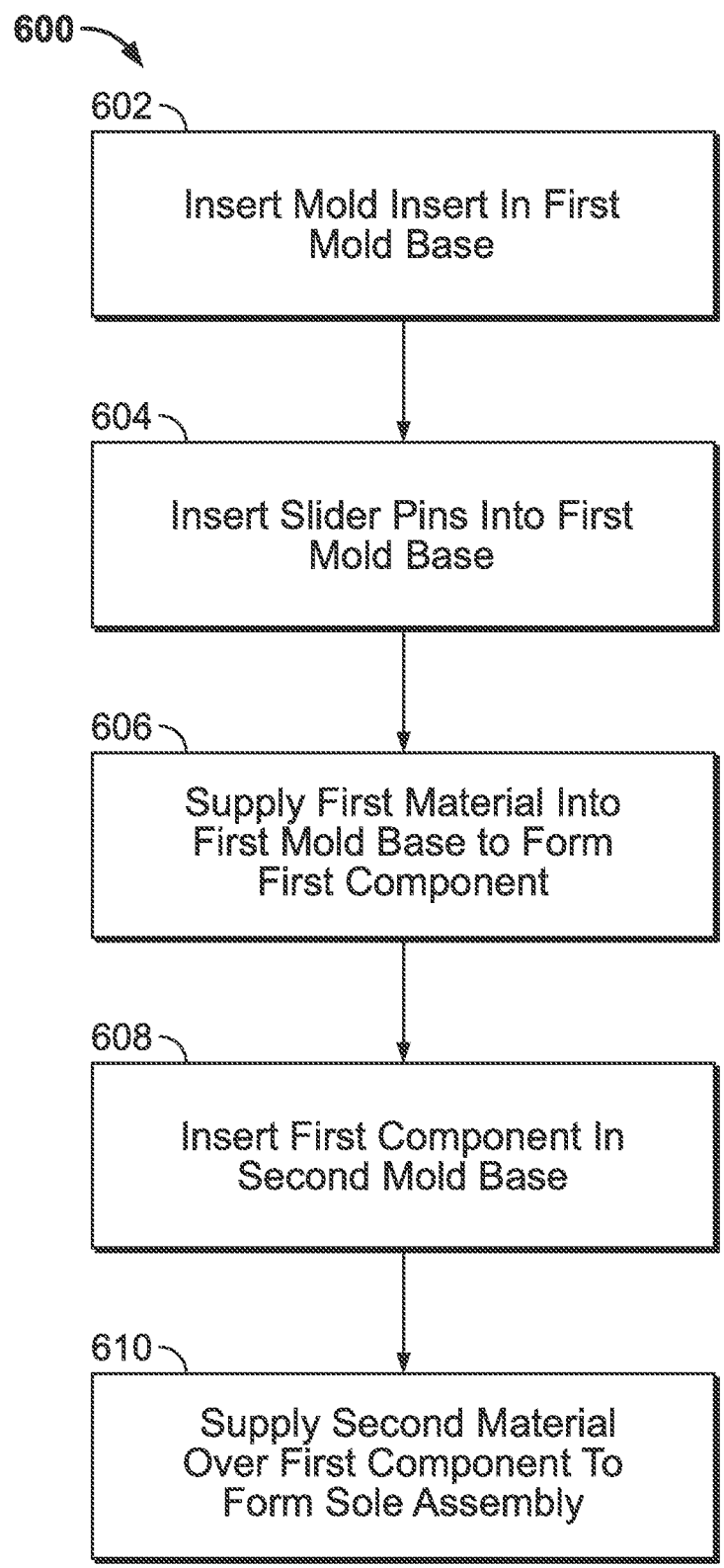
FIG. 18 is a flowchart outlining the steps in another method for manufacturing a sole assembly for an article of footwear.
Figure 19:
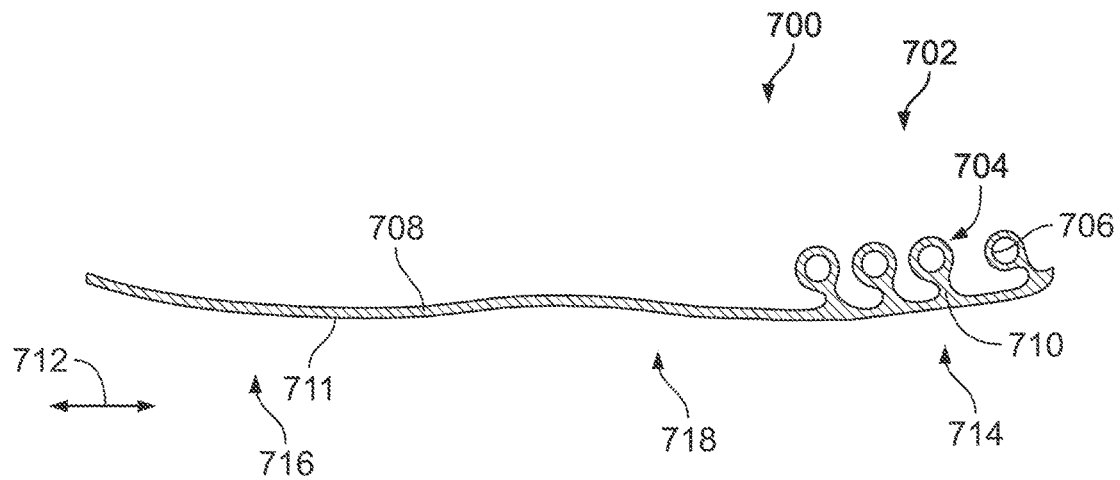
FIG. 19 is a lateral side view of a first component of a sole assembly including a plurality of tubes.
Figure 20:
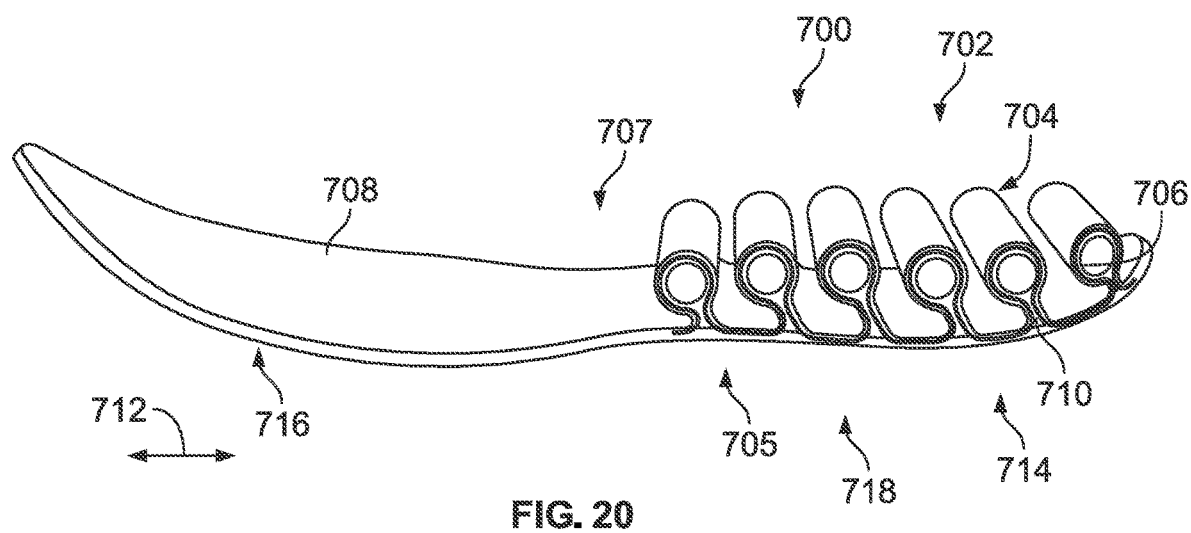
FIG. 20 is a top perspective view of the first component of FIG. 19.
Figure 21:
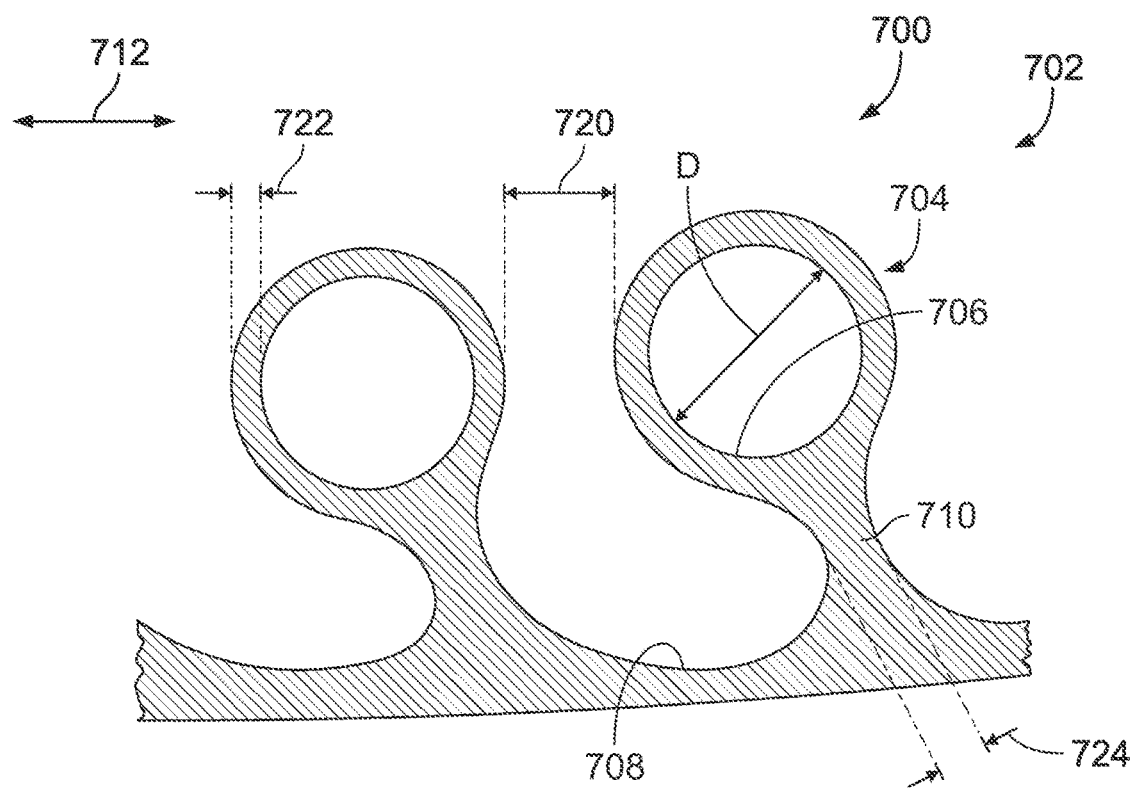
FIG. 21 is an enlarged view of a plurality of tubes of the first component of FIG. 19.

FIGS. 19-21 illustrate the first component 700 of the sole assembly 702 according to one aspect of the present disclosure. In some embodiments, the first component 700 and the sole assembly 702 may be formed from the process outlined in the method 500 (see FIG. 17) or the method 600 (see FIG. 18). In some embodiments, the sole assembly 702 can be formed using techniques described with respect to process 100 (see FIG. 6). In the illustrated embodiment, the first component comprises 700 comprises an outsole. The outsole may be fabricated from a first material. In some embodiments, the first material may comprise a polymer material, e.g., a thermoplastic material, polyurethane, etc.

In the illustrated embodiment, the first component 700 includes a plurality of tubes 704, each including a generally hollow channel 706. The plurality of tubes 704 extend laterally across the first component 700 from a lateral side 705 to a medial side 707. Each of the plurality of tubes 704 is coupled to an upper surface 708 (i.e., a first surface) of the first component 700 by a base portion 710. The plurality of tubes 704 extend outwardly from the upper surface 708 in a direction generally away from a bottom surface 711 (i.e., a second surface) of the first component 700. Each of the base portions 710 may define a thickness that initially decreases and then increases as it extends from a respective one of the plurality of tubes 704 to the upper surface 708, as shown in FIG. 21.

In general, the number of tubes 704 arranged within the first component 700 may vary depending on the desired performance characteristics of the first component 700. The plurality of tubes 704 may be arranged only within a heel region 714, or the plurality of tubes 704 may be spaced along the entire first component 700 between the heel region 714 and a forefoot region 716. In the illustrated embodiment, the plurality of tubes 704 formed in the first component 700 are spaced along the first component 700 in a heel-toe direction 712 from the heel region 714 to a midfoot region 718 as shown in FIG. 20. In some embodiments, the plurality of tubes 704 formed in the first component 700 may be spaced along the first component 700 in the heel-toe direction 712 from the heel region 714 to the forefoot region 716. In some embodiments, the plurality of tubes 704 formed in the first component 700 may be spaced along the first component 700 in the heel-toe direction 712 within the heel region 714, as shown in FIG. 19.

With specific reference to FIG. 21, the plurality of tubes 704 may be formed by a first mold insert so that each of the plurality of tubes 704 is spaced from an adjacent tube 704 by a predetermined gap 720 in the heel-toe direction 712. In some embodiments, the predetermined gap 720 may be a maximum of about five millimeters. In this way, rapid wear of the plurality of tubes 704 may be prevented. The described spacing can be sufficient to allow the tubes 704 to displace during a walking motion and provide increased comfort to a user.

Still referring to FIG. 21, each of the hollow channels 706 formed in the plurality of tubes 704 may define a diameter D. In some embodiments, the diameter D may be between about 6 and about 12 millimeters, or between about 7 and about 11 millimeters, or between about 8 and about 10 millimeters, or between about 9 and about 10 millimeters. As illustrated, each of the plurality of tubes 704 defines a wall thickness 722. In some embodiments, the wall thickness 722 may be between about 2 and about 3 millimeters, or about 2.5 millimeters. Each of the base portions 710 may define a minimum thickness 724. In some embodiments, the minimum thickness may be between about 2 and 5 millimeters, or between about 3 and 4 millimeters, or about 3.5 millimeters. In general, the dimensional ranges for the diameter D, the wall thickness 722, and the minimum thickness 724 may ensure that the base portions 710 and the corresponding tubes 704 coupled thereto are structurally robust while maintaining sufficient flexibility to provide increased comfort to a wearer.

FIGS. 22 and 23 illustrate a second component 750 of the sole assembly 702 according to one aspect of the present disclosure. In some embodiments, the second component 750 and the sole assembly 702 may be formed from the process outlined in the method 500 or the method 600, or from portions of the process 100. In the illustrated embodiment, the second component 750 comprises a midsole. The midsole may be fabricated from a second material, which can comprise a polymer material, e.g., a thermoplastic material, polyurethane, etc. In some embodiments, the first material of the first component 700 is different than the second material of the second component 750 in at least one of color, density, hardness, and chemical composition. For example, the first material may comprise high density polyurethane (e.g., 0.5-1.2 g/cm$^3$) and the second material may comprise low density polyurethane.

In the illustrated embodiment, the second component 750 includes an upper surface 752 (e.g., a first surface), a bottom surface 754 (e.g., a second surface), a lateral side 756, a medial side 758, a heel region 760, a midfoot region 762, and a forefoot region 764. In some embodiments, the second component 750 may include a plurality of apertures 766 that are formed in the bottom surface 754. In the illustrated embodiment, the plurality of apertures 766 extend laterally across the second component 750 from the lateral side 756 to the medial side 758. The size, shape, number, and arrangement of the plurality of apertures 766 formed in the second component 750 may be complementary to the plurality of tubes 704 formed in the first component 700. For example, each of the plurality of apertures 766 defines a profile that conforms to a shape defined by a corresponding one of the plurality of tubes 704 and the accompanying base portion 710 attached thereto. Each of the plurality of apertures 766 may include a tube portion 768 that conforms to an outer surface of a corresponding one of the tubes 704 and a neck portion 770 that conforms to the outer profile of a corresponding one of the base portions 710.

In general, the shape defined by the plurality of apertures 766 and the corresponding tube 704/base portion 710 aid in retaining the tubes 704 within the apertures 766. For example, each of the plurality of apertures 766 formed in the second component 750 may be dimensioned to receive a corresponding one of the plurality of tubes 704 from the first component 700. The variable thickness defined by the base portions 710 and the corresponding neck portions 770 may aid in preventing the tubes 704 from being involuntarily removed from the apertures 766 because the minimum thickness 724, which generally corresponds with the thickness of the neck portions 770, is less than the diameter D of the tubes 704. In this way, the plurality of tubes 704 are urged to remain within the plurality of apertures 766.

In the illustrated embodiment, the upper surface 752 includes a plurality of grooves 772 extending laterally along the upper surface 752. The grooves 772 are spaced from one another in the heel-toe direction 712. In the illustrated embodiment, the grooves 772 are at least partially arranged within the midfoot region 762 and the forefoot region 764. In general, the grooves 234 may provide increased flexibility to the second component 750 and the sole assembly 702.

Turning to FIG. 24, the assembled sole assembly 702 is illustrated. In some embodiments, the sole assembly 702 may be formed using the method 500 where the first component 700 and the second component 750 are pre-molded prior to assembly. The first component 700 is then inserted into the second component 750 so that each of the plurality of tubes 704 may be received within a corresponding one of the plurality of apertures 766 to mechanically couple the first component 700 to the second component 750, which forms the sole assembly 702. The sole assembly 702 may be installed onto an upper to form an article of footwear.

In some embodiments, the sole assembly 702 may be formed using the method 600 where the second component 750 is overmolded onto the first component 700. The sole assembly 702 may be installed onto an upper to form an article of footwear.

Figure 17:
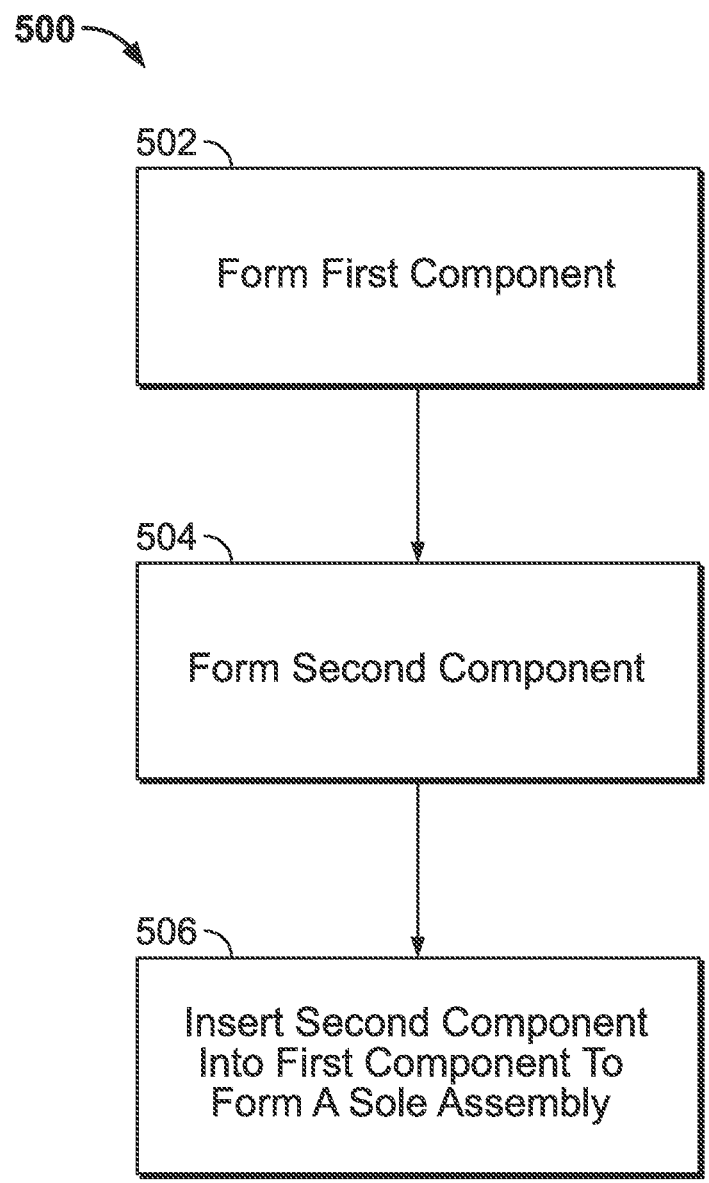
FIG. 17 is a flowchart outlining the steps in another method for manufacturing a sole assembly for an article of footwear.

FIG. 17 outlines a method 500 for manufacturing a sole assembly (e.g., the sole assembly 702 illustrated in FIG. 24) of an article of footwear according to some embodiments of the present disclosure. The method 500 may initiate at block 502 by forming a first component (e.g., the first component 700 illustrated in FIGS. 19-21). The first component may be a molded component that is formed in a first mold. In some embodiments, the first component comprises an outsole. The first mold may include a first mold insert, a first mold plate, a first support frame, and a first set of slider pins that extend laterally through a cavity defined by the first mold (e.g., similar to the second mold 330 illustrated in FIGS. 11-14).

The first mold insert may be fabricated from a wax, sand, or silicon material and may be enclosed between the first mold plate and the first support frame. In general, the inclusion of the first mold insert within the first mold enables the first component to be molded with undercuts and other complex geometries. In some embodiments, the first mold insert includes a plurality of cutouts or apertures that extend laterally across the first mold insert. The size and shape of the plurality of apertures define a size and shape of the corresponding tubes formed in the first component. That is, the absence of material defined by the apertures in the first mold insert may result in the formation of solid material being formed in the first component, e.g., negative geometries (no material) may result in the formation of positive geometries (solid material) in a molding process. In general, the first mold insert may be arranged within the first mold to define and form an upper surface of the first component. In some embodiments, the first mold insert may be arranged on top of the first mold plate (e.g., relative to a direction of gravity).

In some embodiments, the first mold plate may be fabricated from a metal or a silicon material. The first mold plate may be arranged below the first mold insert, e.g., relative to a direction of gravity, and may be arranged within the first mold to define and form a bottom surface of the first component. In some embodiments, the first support frame may be fabricated from a metal material.

To assemble the first mold, the first mold insert may be inserted into the first mold plate, so that a cavity is arranged (e.g., empty volume) between a top surface of the first mold plate and a bottom surface of the first mold insert. The cavity defines the size and shape of the formed first component. The first set of slider pins may be inserted through the apertures defined in the first mold insert. In general, the first set of slider pins may result in the formation of hollow channels being formed through the tubes in the first component. The first support frame may be inserted over the first mold insert to enclose the first mold insert between the first support frame and the first mold plate, if necessary. A first material may flow into the cavity defined between the first mold plate and the first mold insert to form the first component. In some embodiments, the first material may comprise a polymer material, e.g., a thermoplastic material, polyurethane, etc.

In some embodiments, the first component may include a plurality of tubes, each including a generally hollow channel formed by the first set of slider pins, that are formed by the apertures in the first mold insert. Each of the plurality of tubes may be coupled to an upper surface of the first component by a base portion, which is again formed by the size and shape of the apertures defined in the first mold insert. Each of the base portions may define a thickness that initially decreases and then increases as it extends from a respective one of the plurality of tubes to the upper surface.

In some embodiments, the plurality of tubes formed in the first component may be spaced along the first component in a heel-toe direction from a heel region to a midfoot region. In some embodiments, the plurality of tubes formed in the first component may be spaced along the first component in the heel-toe direction from a heel region to a forefoot region. In some embodiments, the plurality of tubes may be formed by the first mold insert so that each of the plurality of tubes is spaced from an adjacent tube by a maximum of about five millimeters in the heel-toe direction. For example, the apertures defined in the first mold insert may be spaced so that each of the plurality of tubes formed in the first component is spaced from an adjacent tube by a maximum of about five millimeters in the heel-toe direction. In this way, the plurality of tubes may be prevented against rapid wear and also may be spaced sufficiently to enable the tubes to displace during a walking motion and provide increased comfort to a user.

Once the first component is formed in the first mold, the first mold may be disassembled by removing the first set of slider pins and removing the first mold insert from the first mold plate. The first component may be decoupled from the first mold insert and the first mold insert may be reused to form more first components.

Figure 25:
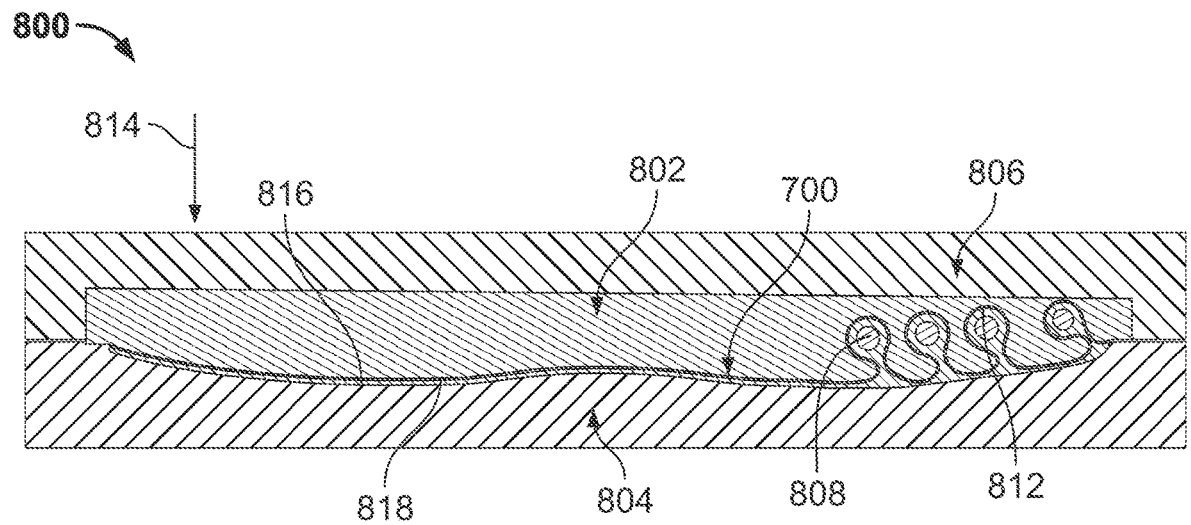
FIG. 25 is a side view of the first component of FIG. 19 arranged within a first mold.

FIG. 25 illustrates a first mold 800 that may be used to form the first component 700 according to the method 500. The first mold 800 includes a first mold insert 802, a first mold plate 804, a first support frame 806, and a first set of slider pins 808 that extend laterally through a cavity defined by the first mold 800.

In some embodiments, the first mold insert 802 may be fabricated from a wax, sand, or silicon material and may be enclosed between the first mold plate 804 and the first support frame 806. In general, the inclusion of the first mold insert 802 within the first mold 800 enables the first component 700 to be molded with undercuts and other complex geometries (e.g., the tubes 704 and corresponding base portions 710 illustrated in FIGS. 18-21). In the illustrated embodiment, the first mold insert 802 includes a plurality of cutouts or apertures 812 that extend laterally across the first mold insert 802. The size and shape of the plurality of apertures 812 define a size and shape of the corresponding tubes 704 formed in the first component 700. That is, the absence of material defined by the apertures in the first mold insert 802 may result in the formation of solid material being formed in the first component 700 (i.e., negative geometries (no material) may result in the formation of positive geometries (solid material) in a molding process). In general, the first mold insert 802 may be arranged within the first mold 800 to define and form the upper surface 708, including the plurality of tubes 704 and base portions 710 of the first component 700.

In some embodiments, the first mold plate 804 may be fabricated from a metal or a silicon material. As illustrated, the first mold plate 804 is arranged below the first mold insert 802, relative to a direction of gravity 814, and is arranged within the first mold 800 to define and form the bottom surface 711 of the first component 700. In some embodiments, the first support frame 806 is fabricated from a metal material.

To assemble the first mold 800, the first mold insert 802 may be inserted into the first mold plate 804, so that a cavity (e.g., an empty volume) is arranged between a top surface 816 of the first mold plate 804 and a bottom surface 818 of the first mold insert 802. The cavity defines the size and shape of the formed first component (e.g., the first component 700 shown in FIGS. 19-21). In some embodiments, as shown, a first set of slider pins 808 are inserted through the apertures 812 defined in the first mold insert 802. In general, the first set of slider pins 808 may result in the formation of the hollow channels being formed through the tubes in the first component (e.g., hollow channels 706 in the tubes 704 of the first component 700 shown in FIGS. 19-21). In some embodiments, as shown, the first support frame 806 is inserted over the first mold insert 802 to enclose the first mold insert 802 between the first support frame 806 and the first mold plate 804. The first material of the first component 700 can be injected into the cavity defined between the first mold plate 804 and the first mold insert 802 to form the first component (e.g., the first component 700 shown in FIGS. 19-21). The first component may be removed from the first mold 800 and from the first mold insert 802, and the first mold insert 802 may be reused to form additional first components 700.

In general, the geometry defined by the first mold insert 802 defines a geometry of the formed first component 700. For example, the predetermined gap 720 may be defined by the geometry of the first mold insert 802 and the spacing between the apertures 812. In addition, the dimensions of the first set of slider pins 808 may define the diameter D and the wall thickness 722 of the plurality of tubes 704.

Referring back to FIG. 17, with the first component formed at block 502, a second component (e.g., the second component 750 illustrated in FIGS. 22-24) may be formed at block 504. The second component may be a molded component that is formed in a second mold. In some embodiments, the second component may comprise a midsole. The second mold may include a second mold insert, a second mold plate, and a second support frame.

The second mold insert may be fabricated from a wax, sand, or silicon material and may be enclosed between the second mold plate and the second support frame. In general, the inclusion of the second mold insert within the second mold enables the second component to be molded with undercuts and other complex geometries. In some embodiments, the second mold insert may include a plurality of solid tube protrusions that extend laterally across the second mold insert. The size and shape of the plurality of solid tube protrusions define a size and shape of the corresponding apertures formed in the second component. That is, the solid structure defined by the solid tube protrusions may result in the absence of material being formed in the second component, e.g., positive geometries (solid material) may result in the formation of negative geometries (no material) in a molding process. In general, the second mold insert may be arranged within the second mold to define and form a bottom surface of the second component. In some embodiments, the second mold insert may be supported by the second support frame. In some embodiments, the second mold insert may be arranged below the second mold plate, e.g., relative to a direction of gravity.

In some embodiments, the second mold plate may be fabricated from a metal or a silicon material. The second mold plate may be arranged on top of the second mold insert, e.g., relative to a direction of gravity, and may be arranged in the second mold to define and form an upper surface of the second component. In some embodiments, the second support frame may be fabricated from a metal material.

To assemble the second mold, the second mold insert may be inserted into the second support frame, and the second mold plate may be inserted onto the second mold insert so that a cavity is arranged (e.g., empty volume) between a bottom surface of the second mold plate and a top surface of the second mold insert. The cavity defines the size and shape of the formed second component. A second material may flow into the cavity defined between the second mold plate and the second mold insert to form the second component. In some embodiments, the second material may comprise a polymer material, e.g., a thermoplastic material, polyurethane, etc. In some embodiments, the first material may be different than the second material in at least one of color, density, hardness, and chemical composition when compared to the first material. For example, the first material may comprise high density polyurethane (e.g., 0.5-1.2 g/cm$^3$) and the second material may comprise low density polyurethane.

Figure 26:
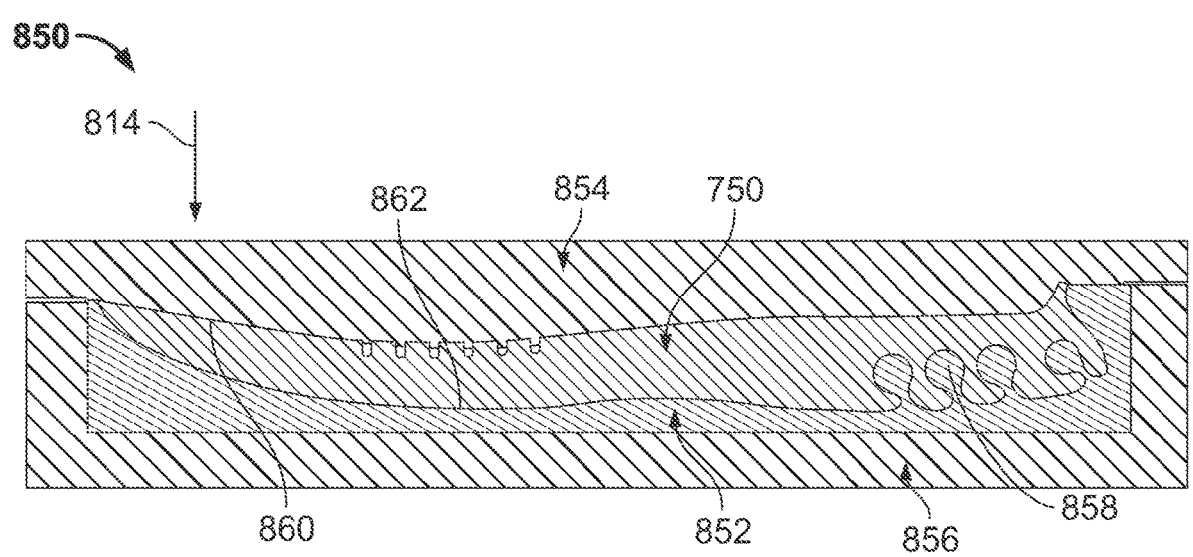
FIG. 26 is a side view of the second component of FIG. 22 arranged within a second mold.

FIG. 26 illustrates a second mold 850 that may be used to form a second component (e.g., the second component 750) according to the method 500. The second mold 850 includes a second mold insert 852, a second mold plate 854, and a second support frame 856.

The second mold insert 852 may be fabricated from a wax, sand, or silicon material and may be enclosed between the second mold plate 854 and the second support frame 856. In general, the inclusion of the second mold insert 852 within the second mold 850 enables the second component (e.g., the second component 750) to be molded with undercuts and other complex geometries (e.g., to form the plurality of apertures 766 shown in FIGS. 22 and 23). In some embodiments, the second mold insert 852 may include a plurality of solid tube protrusions 858 that extend laterally across the second mold insert 852. The size and shape of the plurality of solid tube protrusions 858 define a size and shape of the corresponding apertures 766 formed in the second component 750. That is, the solid structure defined by the solid tube protrusions 858 may result in the absence of material being formed in the second component (e.g., positive geometries (solid material) may result in the formation of negative geometries (no material) in a molding process). In general, the second mold insert 852 may be arranged within the second mold 850 to define and form a bottom surface of the second component (e.g., the bottom surface 754 of the second component 750, including the plurality of apertures 766 illustrated in FIGS. 22 and 23). In some embodiments, the second mold insert 852 may be supported by the second support frame 856. In some embodiments, the second mold insert 852 may be arranged below the second mold plate 854, relative to the direction of gravity 814.

In some embodiments, the second mold plate 854 may be fabricated from a metal or a silicon material. As shown, the second mold plate 854 is arranged on top of the second mold insert 852 relative to the direction of gravity 814 and arranged in the second mold 850 to define and form an upper surface of the second component, which can include grooves (e.g., the upper surface 752 of the second component 750, including the grooves 772 shown in FIGS. 22 and 23). In some embodiments, the second support frame 856 may be fabricated from a metal material.

In some embodiments, including as illustrated, to assemble the second mold, the second mold insert 852 is inserted into the second support frame 856, and the second mold plate 854 is inserted onto the second mold insert 852 so that a cavity (e.g., an empty volume) is arranged between a bottom surface 860 of the second mold plate 854 and a top surface 862 of the second mold insert 852. The cavity defines the size and shape of the formed second component (e.g., the second component 750). The second material may flow into the cavity defined between the second mold plate 854 and the second mold insert 852 to form the second component. The second component may be removed from the second mold 850 and from the second mold insert 852, and the second mold insert may be reused to form additional second components (e.g., substantially identical to second component 750).

In general, the geometry defined by the second mold insert 852 defines a geometry of the formed first component (e.g., the first component 700 shown in FIGS. 19-21). For example, the shape, size, and arrangement of the plurality of apertures 766 of the first component 700 shown in FIGS. 19-21 may be defined by the solid tube protrusions 858 formed in the second mold insert 852.

Referring back to FIG. 17, at block 506, the second component is inserted into the first component to form a sole assembly (e.g., the first component 700 is inserted into the second component 750 to form the sole assembly 702 shown in FIG. 24). In some embodiments, as described, the second component includes a plurality of apertures that are formed by the solid tube protrusions in the second mold insert. The size, shape, number, and arrangement of the plurality of apertures formed in the second component may be complementary to the plurality of tubes formed in the first component. In this way, each of the plurality of apertures formed in the second component may be dimensioned to receive a corresponding one of the plurality of tubes from the first component. Due to this complementary geometry defined between the plurality of apertures in the second component and the plurality of tubes in the first component, each of the plurality of tubes may be inserted into a corresponding one of the plurality of apertures to mechanically couple the first component to the second component at block 506, to form the sole assembly. The sole assembly may be installed onto an upper to form an article of footwear.

In some embodiments, additional components can be formed and assembled in accordance with the techniques described with respect to FIG. 17. For example, a third component can be formed with a third mold, and can include complementary geometries to the second component, so that a sole assembly comprises three components. In some embodiments, the process 500 can be performed along with portions of the process 100. For example, a sole assembly formed by process 500 can be a first portion of a sole assembly, and the first portion of the sole assembly can be inserted into the second mold at block 104 of process 100, and overmolded with another component at block 108 to form a sole assembly. Further, the sole assembly produced by process 500 can be expended and contracted as described in blocks 110, 112, and 114 of process 100.

FIG. 18 outlines a method 600 for manufacturing a sole assembly of an article of footwear according to some embodiments of the present disclosure. The method 600 may initiate at block 602 by inserting a mold insert into a first mold base. In some embodiments, the first component may comprise an outsole. The first mold may include a mold insert, a first mold plate, a first mold base, and a first set of slider pins that extend laterally through a cavity defined by the first mold.

The mold insert may be fabricated from a wax, sand, or silicon material and may be enclosed between the first mold plate and the first mold base. In general, the inclusion of the mold insert within the first mold enables the first component to be molded with undercuts and other complex geometries. In some embodiments, the mold insert includes a plurality of cutouts or apertures that extend laterally across the mold insert. The size and shape of the plurality of apertures define a size and shape of the corresponding tubes formed in the first component. That is, the absence of material defined by the apertures in the mold insert may result in the formation of solid material being formed in the first component, e.g., negative geometries (no material) may result in the formation of positive geometries (solid material) in a molding process. In general, the mold insert may be arranged within the first mold to define and form an upper surface of the first component. In some embodiments, the mold insert may be arranged below the first mold plate, e.g., relative to a direction of gravity. For example, the first mold base may include a base cavity that is dimensioned to receive the mold insert therein. The mold insert may be inserted into the base cavity with the plurality of apertures facing an upward direction, e.g., away from the first mold base.

In some embodiments, the first mold plate may be fabricated from a metal or a silicon material. The first mold plate may be arranged above the mold insert, e.g., relative to a direction of gravity, and may be arranged in the first mold to define and form a bottom surface of the first component. In some embodiments, the first support frame may be fabricated from a metal material.

To assemble the first mold, the first mold insert may be inserted into base cavity of the first mold base at block 602, and the first mold plate may be inserted onto the first mold insert so that a cavity (e.g., the empty volume) is arranged between a bottom surface of the first mold plate and a top surface of the mold insert. The cavity defines the size and shape of the formed first component. The first set of slider pins may be inserted through the apertures defined in the mold insert at block 604. In general, the first set of slider pins may result in the formation of hollow channels being formed through the tubes in the first component. A first material may then be supplied to and flow into the cavity defined between the first mold plate and the mold insert to form the first component at block 606. In some embodiments, the first material may comprise a polymer material, e.g., a thermoplastic material, polyurethane, etc.

Figure 27:
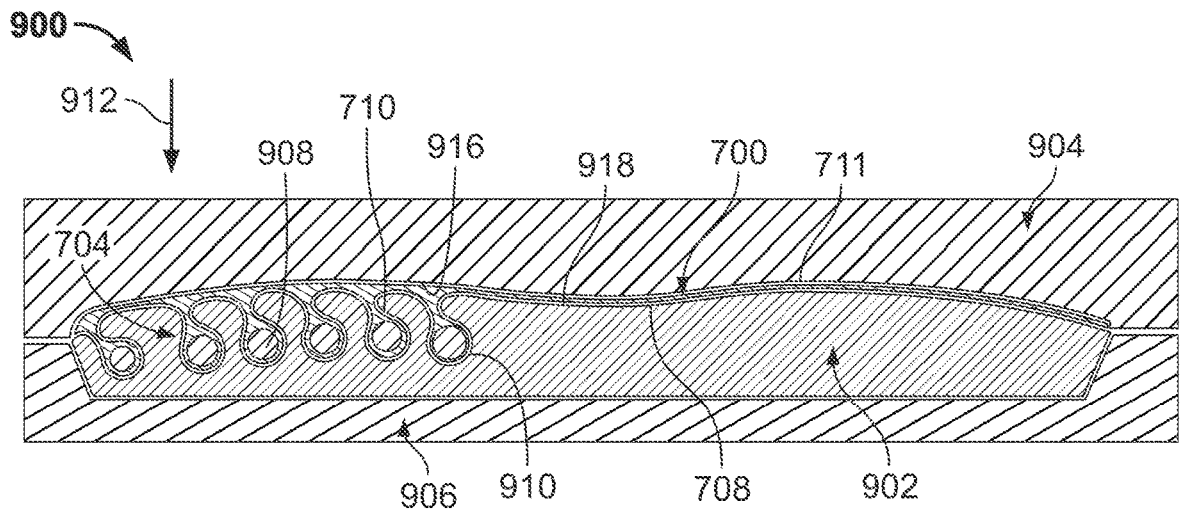
FIG. 27 is a side view of the first component of FIG. 20 arranged within another first mold.
Figure 28:
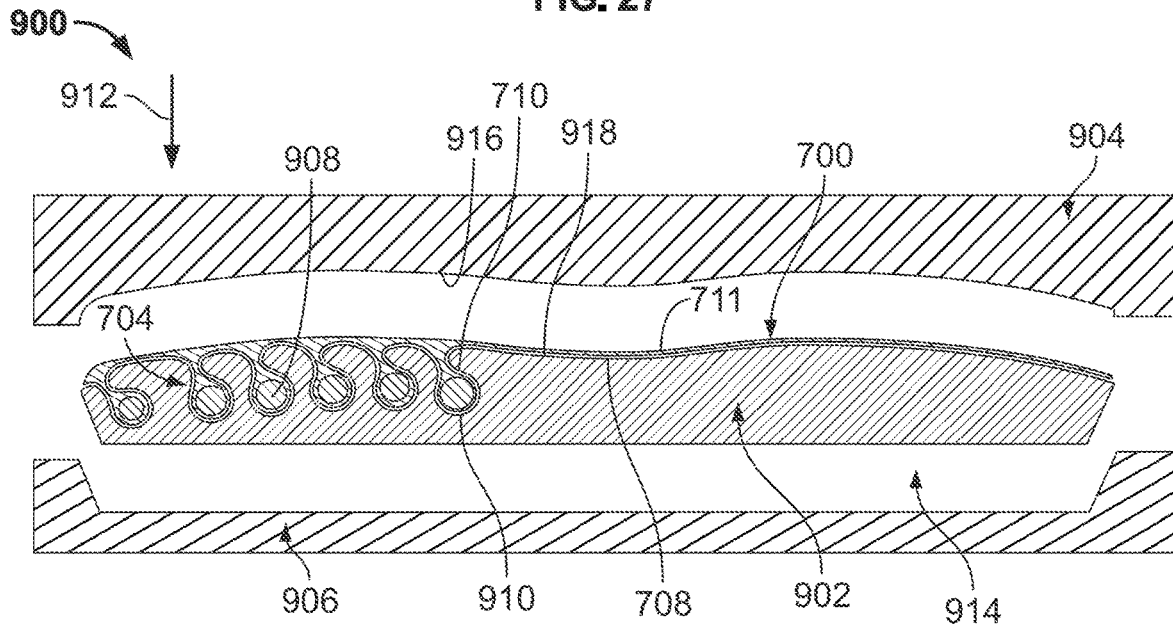
FIG. 28 is an exploded view of the first mold of FIG. 27.
Figure 29:
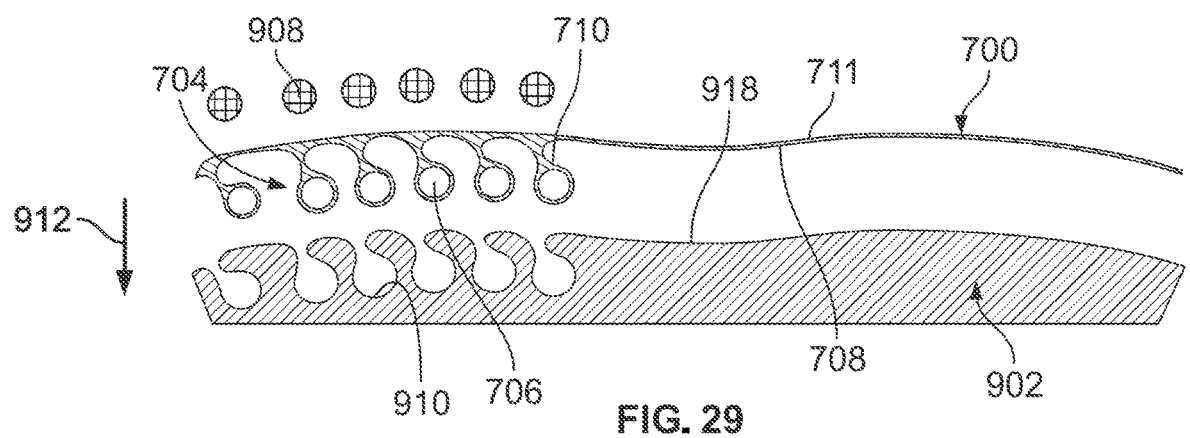
FIG. 29 is an exploded view of a mold insert of the first mold of FIG. 27.

FIGS. 27-29 illustrate a first mold 900 that may be used to form the first component 700 according to the method 600. The first mold 900 includes a mold insert 902, a first mold plate 904, a first mold base 906, and a first set of slider pins 908 that extend laterally through a cavity defined by the first mold 900.

The mold insert 902 may be fabricated from a wax, sand, or silicon material and may be enclosed between the first mold plate 904 and the first mold base 906. In general, the inclusion of the mold insert 902 within the first mold 900 enables the first component 700 to be molded with undercuts and other complex geometries (e.g., the tubes 704 and base portions 710). In the illustrated embodiment, the mold insert 902 includes a plurality of cutouts or apertures 910 that extend laterally across the mold insert 902 (see FIG. 29). The size and shape of the plurality of apertures 910 define a size and shape of the corresponding tubes 704 and base portions 710 formed in the first component 700. In general, the mold insert 902 may be arranged within the first mold 900 to define and form the upper surface 708 of the first component 700. In some embodiments, as illustrated, the mold insert 902 is positioned below the first mold plate 904 relative to a direction of gravity 912. For example, as shown in FIG. 28, the first mold base 906 may include a base cavity 914 that is dimensioned to receive the mold insert 902 therein. The mold insert 902 may be inserted into the base cavity 914 with the plurality of apertures 910 facing an upward direction, away from the first mold base 906 and opposite the direction of gravity 912.

In some embodiments, the first mold plate 904 is fabricated from a metal or a silicon material. In the illustrated embodiment, the first mold plate 904 is be arranged above the mold insert 902, relative to the direction of gravity 912, and is arranged in the first mold 900 to define and form the bottom surface 711 of the first component 700.

To assemble the first mold 900, the mold insert 902 may be inserted into the base cavity 914, and the first mold plate 904 may be inserted onto the mold insert 902 so that a cavity (e.g., an empty volume) is arranged between a bottom surface 916 of the first mold plate 904 and a top surface 918 of the mold insert 902. The cavity defines the size and shape of the formed first component 700. The first set of slider pins 908 may be inserted through the apertures 910 defined in the mold insert 902. In general, the first set of slider pins 908 may form the hollow channels 706 in the tubes 704 of the first component 700. The first material may be supplied to and flow into the cavity defined between the first mold plate 904 and the mold insert 902 to form the first component 700. The first component 700 may be removed from the first mold 900 and from the mold insert 902 (see FIGS. 28 and 29), and the mold insert 902 may be reused to form additional first components 700.

In general, the design and arrangement of the mold insert 902 within the first mold base 906 may form the first component 700 in an upside-down configuration. For example, the first component 700 may be formed in the first mold 900 in an orientation that is upside down relative to an orientation of the first component in use, e.g., when installed on an article of footwear and worn by a user (see, e.g., FIG. 20). Specifically, the mold insert 902 arranges the plurality of apertures 910 in an orientation where the plurality of apertures 910 are lower than the remaining portions of the cavity defined between the mold insert 902 and the first mold plate 904, e.g., relative to the direction of gravity 912. In this way, the design of the first mold 900 can ensure that the first material flows into the plurality of apertures 910 and around the first set of slider pins 908 to form a plurality of tubes 704 in the first component 700.

In general, the geometry defined by the mold insert 902 defines a geometry of the formed first component 700. For example, the predetermined gap 720 may be defined by the geometry of the mold insert 902 and the spacing between the apertures 910. In addition, the dimensions of the first set of slider pins 908 may define the diameter D and the wall thickness 722 of the plurality of tubes 704. In other embodiments, a component of a first mold can be sized and arranged to produce first components (e.g., outsoles, midsoles, or portions of midsoles) having other geometries, including, for example, tubes having different diameters, different wall thicknesses, or defining different peripheral shapes.

Referring back to FIG. 18, once the first component is formed in the first mold by steps 602-606, the first mold may be disassembled by removing the first set of slider pins and removing the mold insert from the first mold base. The first component may be decoupled from the mold insert and the mold insert may be reused to form more first components. The formed first component may then be inserted into a second mold base of a second mold at block 608. The second mold may include the second mold base, a second mold plate, and a second set of slider pins.

The second mold base may include a second mold cavity being defined at least partially by a mold upper surface, e.g., a mold first surface, that is shaped to receive a bottom surface of the first component. In some embodiments, the second set of slider pins may be coupled to a pair of side walls that are movable relative to the second mold base. For example, a first portion of the second set of slider pins may be coupled to a first side wall, and a remaining portion of the second set of slider pins may be coupled to a second side wall. With the first component arranged within the second mold base, the first and second side walls may be installed onto the second mold base by sliding the first and second side walls onto the second mold base. In this way, for example, each of the plurality of tubes formed in the second component may receive a corresponding pair of the second set of slider pins therein, e.g., one slider pin may extend into a lateral side of the tube and another slider pin may extend into a medial side of the tube. Once the second set of slider tubes are arranged within the plurality of tubes formed in the first component, the second mold plate may be installed onto the second mold base. The second mold plate may include a mold bottom surface, e.g., a mold second surface, that is shaped to form an upper surface of the second component. A cavity (e.g., empty volume) defined between the mold bottom surface of the second mold plate and the first component may define the size and shape of the second component. A second material may then be supplied to and flow into the cavity at block 610. The second material may flow over the first component and form a second component that is bonded and attached to the first component. The combination of the first component and the second component may form a sole assembly. In some embodiments, the second component may comprise a midsole. The sole assembly may be removed from the second mold and installed on an upper to form an article of footwear.

In some embodiments, the second material may comprise a polymer material, e.g., a thermoplastic material, polyurethane, etc. In some embodiments, the first material may be different than the second material in at least one of color, density, hardness, and chemical composition when compared to the first material. For example, the first material may comprise high density polyurethane (e.g., 0.5-1.2 g/cm$^3$) and the second material may comprise low density polyurethane.

Figure 30:
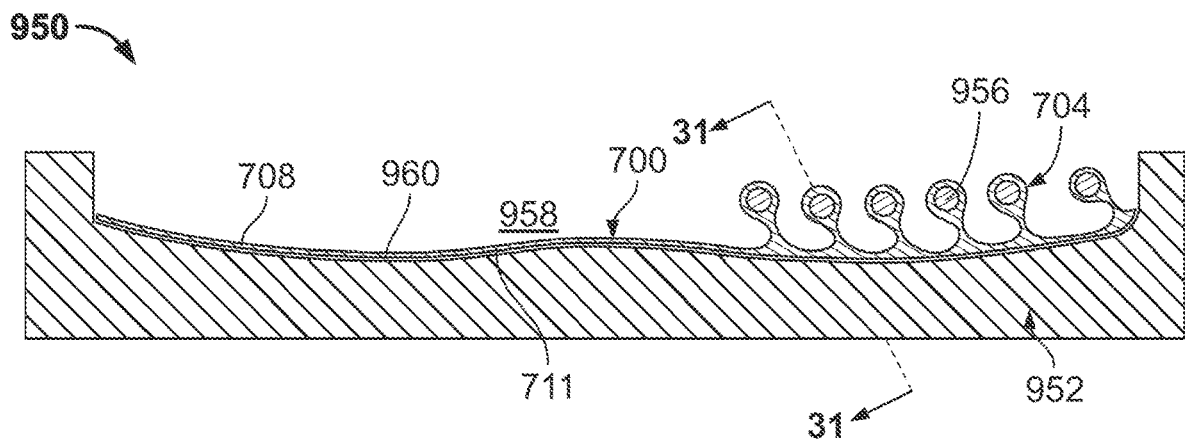
FIG. 30 is a side view of the first component of FIG. 20 arranged within a second mold.
Figure 31:
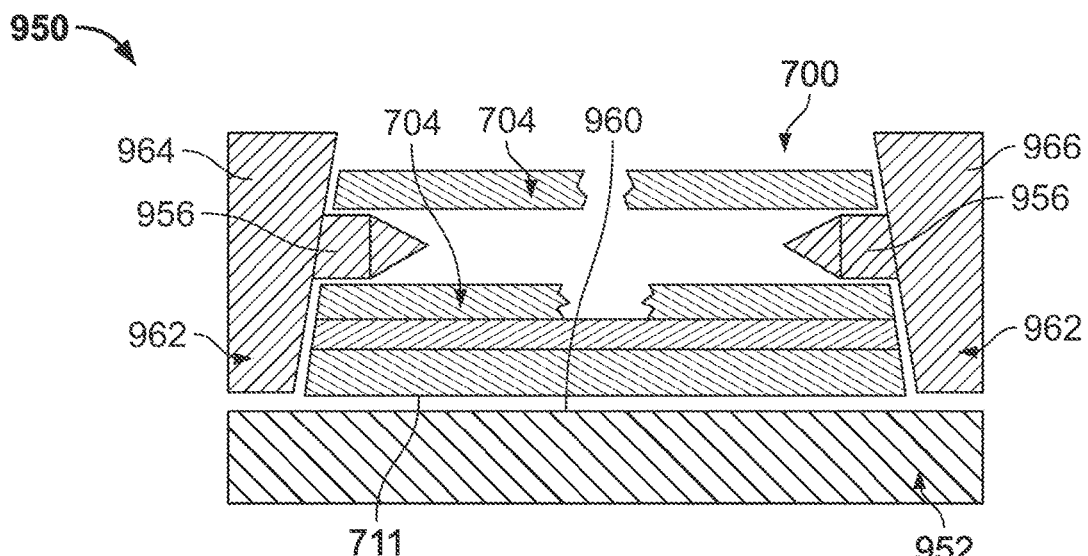
FIG. 31 is a cross-sectional view of the second mold and the first component of FIG. 30 taken along line 31-31.
Figure 32:
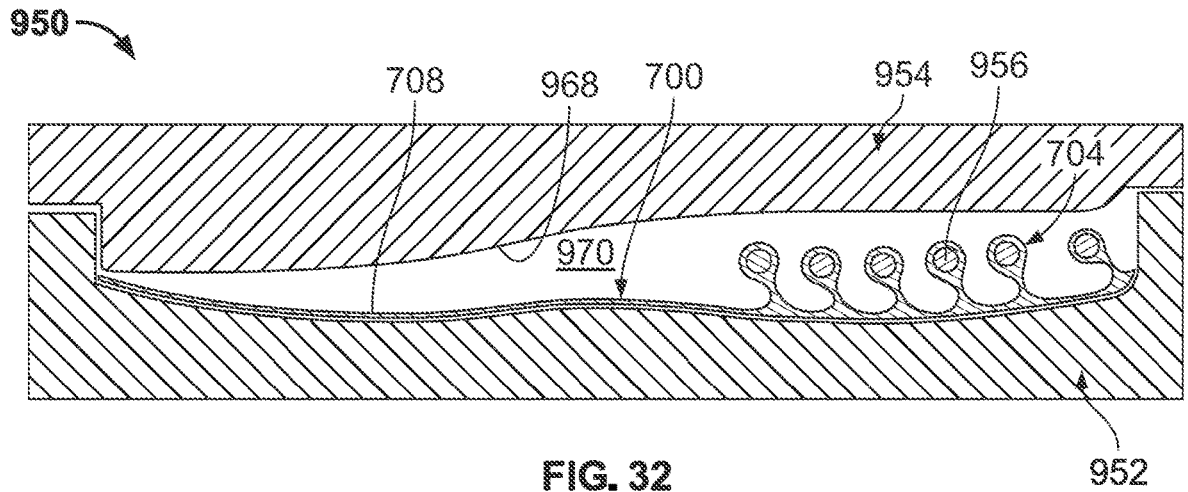
FIG. 32 is a side view of the second mold of FIG. 30 with a second plate installed onto a second mold base.

In some embodiments, the second component may include a plurality of apertures that are formed by the second material flowing around the plurality of tubes in the first component. The size, shape, number, and arrangement of the plurality of apertures formed in the second component may be complementary to the plurality of tubes formed in the first component. FIGS. 30-32 illustrate a second mold 950 that may be used to form the second component 750 and the sole assembly 702 according to the method 600. The second mold 950 may include the second mold base 952, a second mold plate 954, and a second set of slider pins 956.

The second mold base 952 may include a second mold cavity 958 being defined at least partially by a mold upper surface 960 (e.g., a mold first surface, shown in FIG. 31) that is shaped to receive the bottom surface 711 of the first component 700 (see FIG. 30). In the illustrated embodiment, the second set of slider pins 956 are coupled to a pair of side walls 962 that are movable relative to the second mold base 952. For example, a first portion of the second set of slider pins 956 may be coupled to a first side wall 964, and a remaining portion of the second set of slider pins 956 may be coupled to a second side wall 966. With the first component 700 arranged within the second mold base 952, the first and second side walls 964, 966 may be installed onto the second mold base 952 by sliding the first and second side walls 964, 966 laterally onto the second mold base 952. In this way, for example, each of the plurality of tubes 704 formed in the first component 700 may receive a corresponding pair of the second set of slider pins 956 therein (e.g., one slider pin may extend into a lateral side of a tube 704 and another slider pin may extend into a medial side of the tube 704 as shown in FIG. 31). Once the second set of slider pins 956 are arranged within the plurality of tubes 704 formed in the first component 700, the second mold plate 954 may be installed onto the second mold base 952 (see FIG. 32).

The second mold plate 954 may include a mold bottom surface 968, e.g., a mold second surface, that is shaped to form the upper surface 752 of the second component 750 (e.g., as shown in FIG. 22). A cavity 970 defined between the mold bottom surface 968 of the second mold plate 954 and the first component 700 may define the size and shape of the second component. The second material may be supplied to and flow into the cavity 970 to form the second component 750. The second material may flow over the first component 700 and form the second component 750 that is bonded and attached to the first component 700. The combination of the first component 700 and the second component 750 may form the sole assembly 702. The sole assembly 702 may be removed from the second mold 950 and installed on an upper to form an article of footwear. The second mold 950 may be reused to form additional sole assemblies 702.

While the process 600 in FIG. 18 is described with respect to two components, in some embodiments, additional components can be formed according to the disclosed processes and techniques. For example, additional molds can be provided to overmold additional components to sole assemblies produced by any of methods 100, 500, and 600. Further, molds can be provided to produce other complex shapes in sole assemblies of shoes, through using inserts in molds to produce complex geometries as described in processes 500 and 600, or to produce channels through engagement of a first and second component, as described with respect to process 100.

Any of the embodiments described herein may be modified to include any of the structures or methodologies disclosed in connection with different embodiments. Further, the present disclosure is not limited to articles of footwear of the type specifically shown. Still further, aspects of the articles of footwear of any of the embodiments disclosed herein may be modified to work with any type of footwear, apparel, or other athletic equipment.

As noted previously, while the disclosure has been described above in connection with particular embodiments and examples, the disclosure is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

INDUSTRIAL APPLICABILITY

Numerous modifications to the present disclosure will be apparent to those skilled in the art in view of the foregoing description. Accordingly, this description is to be construed as illustrative only and is presented for the purpose of enabling those skilled in the art to make and use the invention. The exclusive rights to all modifications which come within the scope of the appended claims are reserved.

We claim:

1. A method for manufacturing a sole assembly of an article of footwear, the method comprising:
   injecting a first material into a first mold;
   forming, from the first material, a first component in the first mold, the first component including a first plurality of channel elements;
   injecting a second material into a second mold;
   forming, from the second material, a second component in the second mold, the second component including a second plurality of channel elements;
   aligning each of the first plurality of channel elements with a corresponding one of the second plurality of channel elements; and
   securing the first component to the second component to form an initial sole assembly,
   wherein each of the first plurality of channel elements is a first partial channel that extends laterally across the first component,
   wherein forming the first component comprises inserting slider pins into the first mold to form the first plurality of channel elements.

2. The method of claim 1, further comprising, prior to injecting the second material into the second mold, inserting the first component into the second mold, wherein injecting the second material into the second mold includes overmolding the second component onto the first component.

3. The method of claim 1, wherein each of the second plurality of channel elements is a second partial channel that extends laterally across the second component, and wherein aligning each of the first plurality of channel elements with a corresponding one of the second plurality of channel elements include aligning each of the first partial channels with a corresponding second partial channel to form a respective channel between the first component and the second component.

4. The method of claim 1, wherein securing the first component to the second component comprises chemically bonding a surface of the first component with a surface of the second component.

5. The method of claim 1, wherein each of the first plurality of channel elements includes a tube, and each of the second plurality of channel elements includes a cylindrical aperture, wherein securing the first component to the second component includes receiving the tube of each of the first plurality of channel elements into the cylindrical aperture of a corresponding one of the second plurality of channel elements.

6. The method of claim 1, wherein the second mold includes a plurality of second pins extending laterally across an interior of the second mold, the plurality of second pins forming a plurality of channels extending laterally through the initial sole assembly.

7. The method of claim 6, further comprising positioning the plurality of second pins in a corresponding channel element of the first plurality of channel elements.

8. The method of claim 1, further comprising:
   expanding the initial sole assembly to an intermediate size from an initial size to form an expanded sole assembly;
   arranging the expanded sole assembly within a frame; and
   compressing the expanded sole assembly to a final size that is smaller than the intermediate size to form a final sole assembly.

9. The method of claim 1, wherein the first material is different than the second material.

10. The method of claim 1, further comprising:
    forming a drop-in component in a drop-in mold, the drop-in component including a plurality of partial drop-in channels extending laterally across the drop-in component;
    positioning the drop-in component within a cavity defined in the second component.

11. The method of claim 1, wherein the first component includes an outsole.

12. A method for manufacturing a sole assembly of an article of footwear, the method comprising:
    injecting a first material into a first mold;
    forming, from the first material, a first component in the first mold, the first component including a first plurality of channel elements;
    injecting a second material into a second mold;
    forming, from the second material, a second component in the second mold, the second component including a second plurality of channel elements; and
    securing the first component to the second component to form an initial sole assembly,
    wherein forming the first component comprises inserting slider pins into the first mold to form the first plurality of channel elements,
    wherein each of the first plurality of channel elements is a first partial channel that together with a corresponding one of the second plurality of channel elements forms a full channel that extends laterally across the initial sole assembly.

13. The method of claim 12, further comprising, prior to injecting the second material into the second mold, inserting the first component into the second mold, wherein injecting the second material into the second mold includes overmolding the second component onto the first component.

14. The method of claim 12, wherein the second mold includes a plurality of second pins extending laterally across an interior of the second mold, the plurality of second pins forming a plurality of channels extending laterally through the initial sole assembly.

15. The method of claim 14, further comprising positioning the plurality of second pins in a corresponding channel element of the first plurality of channel elements.

16. The method of claim 12, further comprising:
    expanding the initial sole assembly to an intermediate size from an initial size to form an expanded sole assembly;
    arranging the expanded sole assembly within a frame; and
    compressing the expanded sole assembly to a final size that is smaller than the intermediate size to form a final sole assembly.

17. A method for manufacturing a sole assembly of an article of footwear, the method comprising:
    injecting a first material into a first mold;
    forming, from the first material, a first component in the first mold, the first component including a first plurality of channel elements;
    injecting a second material into a second mold;
    forming, from the second material, a second component in the second mold, the second component including a second plurality of channel elements; and
    securing the first component to the second component to form an initial sole assembly, wherein each of the first plurality of channel elements is a first partial channel that extends laterally across the first component, and wherein forming the first component comprises inserting slider pins into the first mold to form the first plurality of channel elements.

18. The method of claim 17, further comprising:

expanding the initial sole assembly to an intermediate size from an initial size to form an expanded sole assembly;

arranging the expanded sole assembly within a frame; and compressing the expanded sole assembly to a final size that is smaller than the intermediate size to form a final sole assembly.

19. The method of claim 17, wherein each of the second plurality of channel elements is a second partial channel that extends laterally across the second component, wherein the method further comprises aligning each of the first partial channels with a corresponding second partial channel to form a respective channel between the first component and the second component.

20. The method of claim 19, further comprising, prior to injecting the second material into the second mold, inserting the first component into the second mold, wherein injecting the second material into the second mold includes overmolding the second component onto the first component.

* * * * *